(12) United States Patent
Lopez-Barron et al.

(10) Patent No.: US 11,512,184 B2
(45) Date of Patent: Nov. 29, 2022

(54) THERMOPLASTIC VULCANIZATE COMPOSITION WITH BI-CONTINUOUS NANOSTRUCTURED MORPHOLOGY

(71) Applicant: Celanese International Corporation, Irving, TX (US)

(72) Inventors: Carlos R. Lopez-Barron, Houston, TX (US); Hamidreza Khakdaman, Houston, TX (US); Brian J. Rohde, Houston, TX (US)

(73) Assignee: Celanese International Corporation, Irving, TX (US)

( * ) Notice: Subject to any disclaimer, the term of this patent is extended or adjusted under 35 U.S.C. 154(b) by 318 days.

(21) Appl. No.: 16/928,817

(22) Filed: Jul. 14, 2020

(65) Prior Publication Data

US 2021/0017361 A1    Jan. 21, 2021

Related U.S. Application Data

(60) Provisional application No. 62/876,421, filed on Jul. 19, 2019.

(51) Int. Cl.
*C08L 9/00* (2006.01)
*C08L 23/12* (2006.01)

(52) U.S. Cl.
CPC .............. *C08L 9/00* (2013.01); *C08L 23/12* (2013.01); *C08L 2205/03* (2013.01); *C08L 2207/02* (2013.01); *C08L 2207/04* (2013.01)

(58) Field of Classification Search
CPC ........ C08L 9/00; C08L 23/12; C08L 2207/02; C08L 2207/04
See application file for complete search history.

(56) References Cited

U.S. PATENT DOCUMENTS

| | | | |
|---|---|---|---|
| 3,634,552 A | 1/1972 | Foglia et al. | 260/897 |
| 5,571,864 A | 11/1996 | Bates et al. | 525/88 |
| 5,654,364 A | 8/1997 | Bates et al. | 525/98 |
| 5,710,219 A | 1/1998 | Bates et al. | 525/240 |
| 5,955,546 A | 9/1999 | Bates et al. | 525/240 |

(Continued)

OTHER PUBLICATIONS

Mader, D. et al. (1999) "Influence of comonomer incorporation on morphology and thermal and mechanical properties of blends based upon isotactic metallocene-polypropene and random ethene/1-butene copolymers," *Journal of Applied Polymer Science*, v.74, pp. 838-848.

(Continued)

*Primary Examiner* — Mark S Kaucher
(74) *Attorney, Agent, or Firm* — Dority & Manning, P.A.

(57) ABSTRACT

A thermoplastic vulcanizate composition, comprising a first phase bi-continuously intertwined with from about 10 wt % to 80 wt % of a second phase throughout the composition, and from about 0.1 wt % to about 10 wt % of a curative system, the first phase comprising polypropylene and the second phase comprising an at least partially cured elastomeric rubber composition, comprising from about 10 wt % to about 40 wt % ethylene, from about 5 wt % to about 10 wt % of a conjugated diene having from 4 to 12 carbon atoms, and from about 50 wt % to about 85 wt % of a $C_4$-$C_8$ alpha olefin, based on the total weight of the elastomeric rubber composition present. A process for making is also disclosed.

24 Claims, 7 Drawing Sheets

(56) References Cited

U.S. PATENT DOCUMENTS

| | | | |
|---|---|---|---|
| 6,953,617 B2 | 10/2005 | DeMeuse | 428/195.1 |
| 2018/0086904 A1* | 3/2018 | Kurita | C08J 3/246 |

OTHER PUBLICATIONS

Thomann, Y. et al. (1998) "Investigation of Morphologies of One- and Two-Phase Blends of Isotactic Poly(propene) with Random Poly(ethene-co-l-butene)," *Macromolecules*, v.31(16), pp. 5441-5449.

Weimann, P. et al. (1997) "Phase Behavior of Isotactic Polypropylene-Poly(ethylene/ethylethylene) Random Copolymer Blends," *Macromolecules*, v.30(12), pp. 3650-3657.

\* cited by examiner

THERMOPLASTIC VULCANIZATE COMPOSITION WITH BI-CONTINUOUS NANOSTRUCTURED MORPHOLOGY

CROSS-REFERENCE TO RELATED APPLICATIONS

This application claims priority to U.S. Ser. No. 62/876,421, filed Jul. 19, 2019, herein incorporated by reference.

This application is related to U.S. Ser. No. 62/876,393, (2019EM247) filed Jul. 19, 2019, herein incorporated by reference.

BACKGROUND

Thermoplastic vulcanizates (TPVs) are characterized as having an elastomeric phase dispersed in a polyolefin. TPVs have a myriad of uses. In applications it is desirable to have TPVs with a relatively low elastic modulus, which often requires incorporating relatively large amounts of various forms of rubber or extender oil into the formulation. As the oil content increases, the advantageous mechanical properties of TPV compositions decrease. Typically, ethylene-propylene diene terpolymers are used as the rubber phase in TPVs. These terpolymers are highly immiscible with many polyolefins, rendering the average particle size of the rubber domains and thus the properties less than optimal.

There is a need in the art for TPVs and other formulations having low elastic modulus and a highly dispersed discontinuous phase.

SUMMARY

In embodiments, a thermoplastic vulcanizate composition comprises a first phase bi-continuously intertwined with from about 10 wt % to 80 wt % of a second phase throughout the composition, and from about 0.1 wt % to about 10 wt % of a curative system, the first phase comprising polypropylene and the second phase comprising an at least partially cured elastomeric rubber composition, comprising from about 10 wt % to about 40 wt % ethylene, from about 5 wt % to about 10 wt % of a conjugated diene having from 4 to 12 carbon atoms, and from about 50 wt % to about 85 wt % of a $C_4$ to $C_8$ alpha olefin, based on the total weight of the elastomeric rubber composition present.

In one or more embodiments of the invention, a process to produce a thermoplastic vulcanizate composition comprises the steps of combining: i) a first component comprising propylene; ii) from 10 wt % to 80 wt % of a second elastomeric rubber component comprising from about 10 wt % to about 40 wt % ethylene and from about 5 wt % to about 10 wt % of a conjugated diene having from 4 to 12 carbon atoms and from about 50 wt % to about 85 wt % of a $C_4$-$C_8$ alpha olefin; and iii) from about 0.1 wt % to about 10 wt % of a curative system, based on the total weight of the composition, under melt conditions to form a melt mixture in which the first component and the second component are fully melt miscible; dynamically vulcanizing the composition to at least partially cure the elastomeric rubber component; and cooling the melt mixture to form the thermoplastic vulcanizate composition comprising an intertwined bi-continuous nanostructure morphology throughout the composition comprising a plurality of portions in which the first phase is dispersed within the second phase within an area of less than 1 $\mu m^2$, and a plurality of portions in which the second phase is dispersed within the first phase within an area of less than 1 $\mu m^2$.

In one or more embodiments of the invention, an article or manufacture comprises one or more embodiments of the thermoplastic vulcanizate composition according to the instant disclosure.

DETAILED DESCRIPTION

Figure 1A:
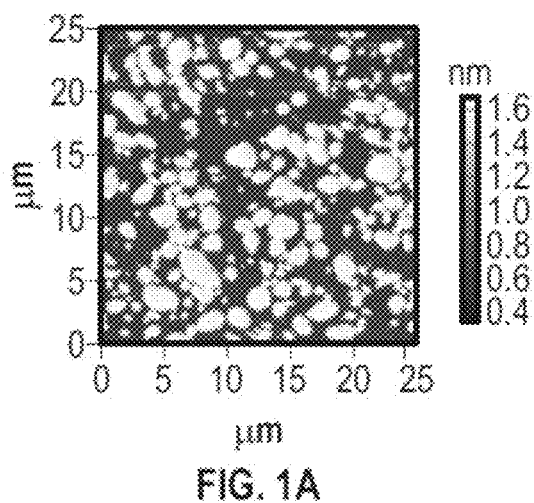
FIG. 1A is a photograph of an AFM micrograph of a comparative thermoplastic vulcanizate composition.

Initially it is noted that, in the development of any actual embodiments, numerous implementation-specific decisions must be made to achieve the developer's specific goals, such as compliance with system-related and business-related constraints, which will vary from one implementation to another. Moreover, it will be appreciated that such a development effort might be complex and time consuming but would nevertheless be a routine undertaking for those of ordinary skill in the art having the benefit of this invention. In addition, the compositions and processes disclosed herein can also comprise components or steps other than those cited or specifically referred to.

Throughout the entire specification, including the claims, the following terms shall have the indicated meanings.

The term "and/or" refers to both the inclusive "and" case and the exclusive "or" case, whereas the term "and or" refers to the inclusive "and" case only, and such terms are used herein for brevity. For example, a composition comprising "A and/or B" may comprise A alone, B alone, or both A and B; and a composition comprising "A and or B" may comprise A alone, or both A and B.

The percentage of a particular monomer in a polymer or a component of a composition is expressed herein as weight percent (wt %) based on the total weight of the polymer or component present. All other percentages are expressed as weight percent (wt %), based on the total weight of the particular composition present, unless otherwise noted. Room temperature is 25° C.±2° C. and atmospheric pressure is 101.325 kPa unless otherwise noted.

The term "consisting essentially of" in reference to a composition is understood to mean that the in addition to the indicated component, the composition may further include additional compounds in such amounts and to the extent that the additional compounds do not substantially interfere with the essential function or indicated properties of the overall composition. If no essential function or property is indicated, a composition which consists essentially of an indicated component or composition may include any amount up to 5 percent by weight of the additional components, if any at all.

For purposes herein a "polymer" refers to a compound having two or more "mer" units, also referred to herein as residues; e.g., having a degree of polymerization of two or more, where the mer units can be of the same or different species. A "homopolymer" is a polymer having mer units or residues that are the same species. A "copolymer" is a polymer having two or more different species of mer units or residues. A "terpolymer" is a polymer having three different species of mer units. Unless specifically indicated, copolymer and terpolymer are used synonymously herein. "Different" in reference to mer unit species indicates that the mer units differ from each other by at least one atom or are different isomerically. Unless otherwise indicated, reference to a polymer herein generically includes a homopolymer, a copolymer, a terpolymer, or any polymer comprising a plurality of the same or different species of repeating units.

As used herein, the term "residue" refers to the organic structure of the monomer in its "as-polymerized" form as incorporated into a polymer, e.g., through polymerization of the corresponding monomer. Throughout the specification and claims, reference to the monomer(s) in the polymer is understood to mean the corresponding "as-polymerized" form or residue of the respective monomer.

The term "thermoplastic vulcanizate", as used herein, refers to a composition comprising two different phases: a first thermoplastic continuous phase and a second at least partially crosslinked elastomeric phase dispersed in the continuous phase. Thermoplastic vulcanizates (TPVs) also include a curative system which is activated to at least partially crosslink the elastomeric phase. TPVs are suitable for transformation by various processing technologies including injection molding, blow molding, film, fiber, sheet extrusion, thermoforming, and the like.

As used herein, the prefixes di- and tri- generally refer to two and three, respectively. Similarly, the prefix "poly-" generally refers to two or more, and the prefix "multi-" to three or more.

For purposes herein, an essentially amorphous polymer is defined as a polymer that does not exhibit a substantial crystalline melting point, Tm, i.e., no discernable heat of fusion or a heat of fusion less than 5 J/g, when determined by differential scanning calorimetry (DSC) analysis from the second heating ramp by heating of the sample at 10° C./min from 0° C. to 300° C. For purposes herein, in the absence of DSC analysis, an amorphous polymer is indicated if injection molding of the polymer produces an article which is essentially clear, wherein the injection molding process used is known to produce articles having cloudy or opaque character upon injection molding of a semi-crystalline polymer having similar properties to the amorphous polymer.

Conversely, a polymer exhibiting a crystalline melting point may be crystalline or semicrystalline. A semicrystalline polymer contains at least 5 weight percent of a region or fraction having a crystalline morphology and at least 5 weight percent of a region or fraction having an amorphous morphology.

For purposes herein, the melting temperature, crystallization temperature, glass transition temperature, and the like, are determined by DSC analysis from the second heating ramp by heating of the sample at 10° C./min from 0° C. to 300° C. The melting, crystallization, and glass transition temperatures are measured as the midpoint of the respective endotherm or exotherm in the second heating ramp.

For purpose herein, proton NMR spectra are collected using a suitable instrument, e.g., 500 MHz Varian pulsed Fourier transform NMR spectrometer equipped with a variable temperature proton detection probe operating at 120° C. Typical measurement of the NMR spectrum include dissolving of the polymer sample in 1,1,2,2-tetrachloroethane-d2 ("TCE-d2") and transferring into a 5 mm glass NMR tube. Typical acquisition parameters were sweep width of 10 KHz, pulse width of 30 degrees, acquisition time of 2 seconds, acquisition delay of 5 seconds with a total of 120 scans or more. Chemical shifts are determined relative to a TCE-d2 signal which is typically set to 5.98 ppm.

For purposes herein, the morphology of the dispersed phase within the continuous phase of the composition is determined using atomic force microscopy (AFM) unless otherwise specified. Unless otherwise specified, the average particle size refers to volume-based particle size in which the measurement is based on the diameter of a sphere that has the same volume as a given particle according to the formula:

$$D = 2\sqrt[3]{\frac{3V}{4\pi}}$$

wherein D=diameter of the representative sphere; and V=volume of the particle.

Atomic force microscopy is carried out using a Bruker ICON Atomic Force Microscope or the like. Typical analysis involves the cryo-microtoming of the sample prior to scanning in order to create a smooth surface at −80° C. After microtoming, the samples are purged under nitrogen in a desiccator before AFM evaluation. Imaging is typically conducted by tuning to the fundamental (1st) mode of the cantilever, setting the amplitude at 1.0 V and the drive frequency to about 5% below the free-air resonance frequency of the cantilever. Calibration is conducted using suitable standards, e.g., Asylum Research reference standard (10 microns×10 microns pitch grating×200 nm deep pits) for AFM SQC and X, Y, and Z calibration. Unless otherwise indicated, instrument calibration assumes an accuracy of +/−2%, with a true value for X-Y within 5% or better for Z. Representative scan sizes include 25×25 µm, 15×15 µm, 2.5×2.5 µm, 1×1 µm, and 500×500 nm.

As used herein, a bi-continuous intertwined nanostructure morphology refers to a composition comprising portions in which a first phase is continuously dispersed within a second phase, contemporaneously with portions in which the second phase is dispersed within the first phase, throughout at least 50% of the total area of a sample, wherein discreet areas of the intertwined dispersed phases are visible by AFM over an area of less than 1 µm$^2$, preferably less than 500 nm$^2$ or 100 nm$^2$ (square nanometers). This is in contrast to a composition in which the dispersed phase forms a plurality of discrete domains within the continuous phase.

For purposes herein, the molecular weights are determined using high temperature gel permeation chromatography, "GPC-3D" employed on a suitable HPLC system, e.g., an Agilent PL-220® system) equipped with three in-line detectors: a differential refractive index detector (DRI), a light scattering (LS) detector, and a viscometer. Experimental details, including detector calibration, are described in Sun et al. (2001) "Effect of Short Chain Branching on the Coil Dimensions of Polyolefins in Dilute Solution," *Macromolecules*, v. 34(19) pp. 6812-6820 and references therein. A typical configuration includes three Agilent® PLgel 10 µm Mixed-B LS columns with a nominal flow rate of 0.5 mL/min and a nominal injection volume of 300 µL. The various transfer lines, columns, viscometer and differential refractometer (the DRI detector) are contained in an oven maintained at 145° C. Solvent is typically prepared by dissolving 6 grams of butylated hydroxytoluene as an antioxidant in 4 liters of reagent grade 1,2,4-trichlorobenzene (TCB). The TCB mixture was then filtered through a 0.1 µm Teflon® filter. The TCB was then degassed with an online degasser before entering the GPC-3D. Unless noted otherwise, polymer solutions are prepared by placing dry polymer in a glass container, adding the desired amount of TCB, then heating the mixture at 160° C. with continuous shaking for about 2 hours. All quantities are measured gravimetrically. Typical TCB densities used to express polymer concentration in mass/volume units are 1.463 g/ml at room temperature and 1.284 g/ml at 145° C. Suitable injection concentrations are from 0.5 to 2.0 mg/ml, with lower concentrations being used for higher molecular weight samples. To ensure accuracy, prior to running each sample, the DRI detector and the viscometer are typically purged. Flow rate in the apparatus is typically increased to 0.5 ml/minute, and the DRI allowed to stabilize for 8 hours before injecting the first sample. Likewise, the LS laser is typically stabilized at least 1 to 1.5 hours before running samples. The concentration, c, at each point in the chromatogram may then be calculated from the baseline-subtracted DRI signal, IDRI, using the following equation:

$$c = K_{DRI} I_{DRI}/(dn/dc),$$

where KDRI was a constant determined by calibrating the DRI, and (dn/dc) was the refractive index increment for the system. The refractive index, n=1.500 for TCB at 145° C. and λ=690 nm. Units on parameters throughout this description of the GPC-3D method were such that concentration is expressed in g/cm$^3$, molecular weight is expressed in g/mole, and intrinsic viscosity is expressed in dL/g.

Suitable LS detectors include Wyatt Technology High Temperature Dawn Heleos™ II. The molecular weight, M, at each point in the chromatogram may be determined by analyzing the LS output using the Zimm model for static light scattering (M. B. Huglin, *Light Scattering from Polymer Solutions*, Academic Press, 1971):

$$\frac{K_o c}{\Delta R(\theta)} = \frac{1}{MP(\theta)} + 2A_2 c,$$

where ΔR(θ) was the measured excess Rayleigh scattering intensity at scattering angle θ, c was the polymer concentration determined from the DRI analysis, $A_2$ was the second virial coefficient. P(θ) was the form factor for a monodisperse random coil, and $K_o$ was the optical constant for the system:

$$K_o = \frac{4\pi^2 n^2 (dn/dc)^2}{\lambda^4 N_A}$$

where NA was Avogadro's number, and (dn/dc) was the refractive index increment for the system, which take the same value as the one obtained from DRI method. The refractive index, n=1.500 for TCB at 145° C. and λ=657 nm.

All molecular weights are weight average ($M_w$) unless otherwise noted. All molecular weights are reported in g/mol unless otherwise noted. For most aliphatic polyolefin such as PE and PP, the Mark-Houwink parameters, dn/dc and $A_2$ can be found in the literature (Sun et al. (2001) *Macromolecules*, v. 34(19), pp. 6812-6820). For a new polymer, the above parameters are determined separately.

If the polymer was completely soluble, the dn/dc value can be calculated from its mass recovery by comparing with a reference material (PE or PS) as shown in the below equation:

$$\frac{dn}{dc} = \frac{MR}{MR_{ref}} \left(\frac{dn}{dc}\right)_{ref}$$

where "MR" was mass recovery. The Mark-Houwink parameter k and a can be obtained by fitting the linear part of [η] vs. MLS data. The A2 was simply assumed to be the same as the reference material because it does not influence the MW calculation much at very dilute concentration.

Dynamic mechanical thermal analysis ("DMTA") as used herein refers to analysis conducted according to procedures known in the art. Suitable instruments include those provide by Rheometrics, Inc (TA Instruments, USA) unless stated otherwise. For purposes herein, samples are prepared as small rectangular samples, the whole sample approximately 19.0 mm long by 5 mm wide by 0.5 mm thick polymer samples. Samples are molded at approximately 190° C. on either a Carver Lab Press or Wabash Press. If no stabilizer or antioxidant was already present in the polymer sample, about 0.1 wt % of butylated hydroxytoluene ("BHT") was added to the sample. The polymer samples are then loaded into the open oven of the instrument between tool clamps on both ends. The length of sample is recorded once sample was stabilized at the testing temperature. After the oven and sample has reached testing temperature of 25° C., the test initiated. Calibration and quality control for the measurements are typically conducted by performing a dynamic temperature ramp at 6.28 rad/s (1 Hz) from −150° C. to 100° C. at 0.1% strain on a standard sample having known properties, e.g., ExxonMobil Exact™ 4049 plastomer, having a local maximum of the tan delta curve of −40.5° C., and a tan delta of 0.3478.

For purposes herein, ASTM refers to the American Society for Testing and Materials; it is to be understood that when an ASTM method is referred to for use in characterizing a property of a sample, the ASTM method referred to is the current revision of the ASTM method in force at the time of filing of this application, unless otherwise indicated.

As used herein, components which are melt miscible, also referred to as fully or completely melt miscible, form a homogenous solution under melt conditions, i.e., when heated above the highest melting point of the components present.

In one or more embodiments of the invention, a thermoplastic vulcanizate composition comprises a first phase bi-continuously intertwined with from about 10 wt % to 80 wt % of a second phase throughout the composition, and from about 0.1 wt % to about 10 wt % of a curative system, the first phase comprising polypropylene and the second phase comprising an at least partially cured elastomeric rubber composition, comprising from about 10 wt % to about 40 wt % ethylene, from about 5 wt % to about 10 wt % of a diene, preferably a conjugated diene having from 4 to 12 carbon atoms, and from about 50 wt % to about 85 wt % of a $C_4$-$C_8$ alpha olefin, based on the total weight of the elastomeric rubber composition present.

In one or more embodiments of the invention, the elastomeric rubber composition comprises about 50 wt % to about 70 wt % of the $C_4$-$C_8$ alpha olefin, based on the total weight of the elastomeric rubber composition present. In one or more embodiments of the invention, the elastomeric rubber composition comprises from about 10 wt % to about 40 wt % ethylene, from about 5 wt % to about 10 wt % ethylidene norbornene, and from about 50 wt % to about 85 wt % of 1-butene, based on the total weight of the elastomeric rubber composition present.

In one or more embodiments of the invention, the elastomeric rubber composition has a number averaged molecular weight of about 100,000 g/mol to about 400,000 g/mol. In one or more embodiments of the invention, the elastomeric rubber composition comprises a melt index of less than 5 g/10 min @230° C./2.16 kg, when determined according to ASTM D 1238. In one or more embodiments of the invention, the first and second phases form a bi-continuous nanostructure morphology throughout at least 50% of the area occupied by the composition, preferably at least 80% of the area, preferably at least 95% of the area, comprises a plurality of portions in which the first phase is dispersed within the second phase within an area of less than 1 μm², and a plurality of portions in which the second phase is dispersed within the first phase within an area of less than 1 μm².

In one or more embodiments of the invention, the first phase consists essentially of isotactic polypropylene homopolymer and the second phase consists essentially of amorphous butene-ethylene-ethylidene norbornene terpolymer comprising greater than or equal to about 10 wt % and less than or equal to about 40 wt % ethylene.

In one or more embodiments of the invention, the thermoplastic vulcanizate composition comprises from about 10 wt % to about 50 wt % of the second phase, based on the total weight of the thermoplastic vulcanizate composition. In one or more embodiments of the invention, the first phase and the second phase are fully melt-miscible at a temperature above the melting points of both the first and the second phases.

In one or more embodiments of the invention, the composition further comprises from 1 part per hundred rubber to 200 parts per hundred rubber of a paraffinic oil, based on the total weight of the elastomeric rubber composition present.

In one or more embodiments of the invention, the composition has a single glass transition temperature, when determined according to ASTM D4440; a Shore A hardness of less than or equal to about 70, preferably less than or equal to about 60, preferably less than or equal to about 50 when determined according to ASTM D2240; a flexural modulus of less than or equal to about 150 MPa, preferably less than or equal to about 75 MPa, preferably less than or equal to about 50 MPa, when determined according to ASTM D790; an elongation at break of greater than or equal to about 400%, preferably greater than or equal to about 500%, when determined according to ASTM D638; a tensile stress at break of less than 20 MPa, preferably less than 16 MPa, preferably less than 14 MPa, when determined according to ASTM D638; a hysteresis (Joules) of less than 2.5 MPa, preferably less than 2 MPa, preferably less than 1.5 MPa, when determined according to ASTM D624; a tensile set of less than about 80%, preferably less than about 60%, preferably less than about 40%, when determined according to ASTM D624; or a combination thereof.

In one or more embodiments of the invention, the second phase comprises less than 0.1 wt % propylene.

In one or more embodiments of the invention, an article or manufacture comprises one or more thermoplastic vulcanizate compositions according to one or more embodiments disclosed herein.

In one or more embodiments of the invention, a process to produce a thermoplastic vulcanizate composition comprises the steps of A) combining: i) a first component comprising propylene; ii) from 10 wt % to 80 wt % of a second elastomeric rubber component comprising from about 10 wt % to about 40 wt % ethylene and from about 5 wt % to about 10 wt % of a conjugated diene having from 4 to 12 carbon atoms and from about 50 wt % to about 85 wt % of a $C_4$-$C_8$ alpha olefin; and iii) from about 0.1 wt % to about 10 wt % of a curative system, based on the total weight of the composition, under melt conditions to form a melt mixture in which the first component and the second component are fully melt miscible; (B) dynamically vulcanizing the composition to at least partially cure the elastomeric rubber component; and (C) cooling the melt mixture to form the thermoplastic vulcanizate composition comprising an intertwined bi-continuous nanostructure morphology throughout the composition comprising a plurality of portions in which the first phase is dispersed within the second phase within an area of less than 1 μm², and a plurality of portions in which the second phase is dispersed within the first phase within an area of less than 1 μm².

In one or more embodiments of the invention, the first phase consists essentially of isotactic polypropylene and the elastomeric rubber component comprises from about 10 wt % to about 40 wt % ethylene, from about 5 wt % to about 10 wt % ethylidene norbornene, from about 50 wt % to about 85 wt % of 1-butene, and less than 0.1 wt % propylene, based on the total weight of the elastomeric rubber component present. In one or more embodiments of the invention, the process further comprises combining from 1 part per hundred rubber to 200 parts per hundred rubber of a paraffinic oil with the first component and the second component under melt conditions, based on the total amount of the elastomeric rubber composition present.

In an embodiment, the mixture is produced by preheating the internal mixer to 180° C. and running at 81 rpm. The components are then added sequentially: 1—BEDM; 2—iPP; 3—paraffinic oil (Sunpar 150, HollyFrontier). As part of this preloading process, most of the oil is added at this point. These steps are followed by addition 4—phenolic resin (RIO). The mixture then mixed to allow the torque and temperature to equilibrate; the rest of the components are then added quickly: 5—$SnCl_2$, 6—ZnO, and the remainder of the paraffinic oil (Sunpar 150). In this example, the postloading includes addition of 5 phr oil. The mixture if mixed to allow mixer torque and temperature to equilibrate and the then continue mixing for 5 minutes. The blend is then unloaded from the mixer and allow to cool to room temperature.

Common reasoning in the art suggests that the elastic properties of TPVs are highly dependent on the rubber content and the rubber domain average size and size distribution of the dispersed phase, typically referred to as polydispersity, PDI. In general, the lower averaged domain size and the higher the dispersity, the higher the tensile strength and elongation at break of the resulting TPV. However, applicant has discovered that the thermodynamic limit for domain size in immiscible blends is in the order of microns. Applicant has further discovered that this practical domain size limit of the dispersed phase may be reduced by selecting elastomeric rubber compositions that are highly compatible with, preferably melt miscible with the thermoplastic continuous phase. As the melt is cooled the thermoplastic vulcanizate composition formed comprises an intertwined, bi-continuous nanostructure morphology throughout most, i.e., greater than 50% of the area occupied by the composition, preferably greater than 70% of the area occupied by the composition, preferably greater than 80% of the area occupied by the composition, preferably greater than 90% of the area occupied by the composition, preferably essentially all of the composition comprises an intertwined, bi-continuous nanostructure morphology.

Figure 1B:
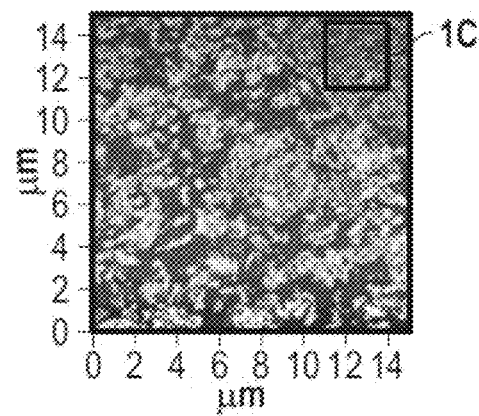
FIG. 1B is a photograph of an AFM micrograph showing the intertwined bi-continuous nanostructure morphology of the thermoplastic vulcanizate composition according to embodiments of the invention.
Figure 1C:
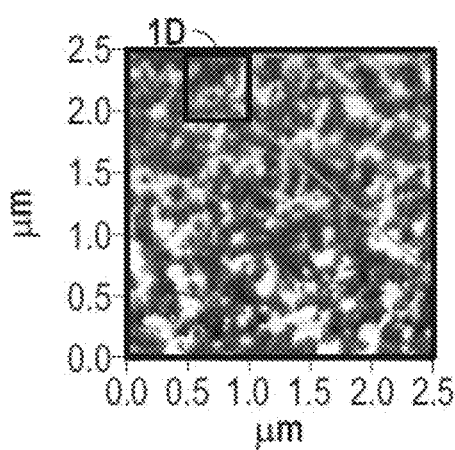
FIG. 1C is a photograph of an AFM micrograph of portion A of FIG. 1B, shown at higher magnification.
Figure 1D:
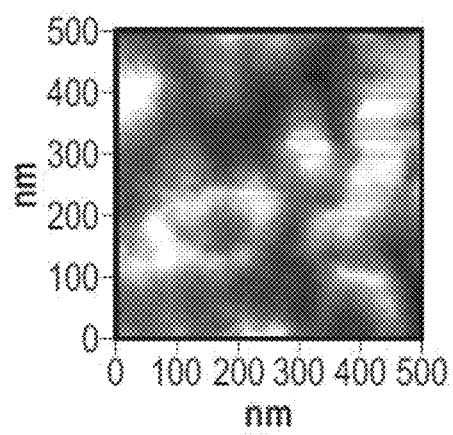
FIG. 1D is a photograph of an AFM micrograph of portion B of FIG. 1C, shown at higher magnification.

Turning to FIG. 1A, the AFM micrograph shows a comparative TPV at a resolution of 15×15 micrometers in which the continuous phase, the iPP matrix (dark regions) surrounds the dispersed phase of rubber domains (bright regions) with sizes in the order of a few microns. In contrast to a typical dispersion pattern of TPVs, FIGS. 1B, 1C, and 1D show an inventive TPV according to the instant disclosure. FIG. 1B shows an AFM micrograph of inventive example 6 (see experimental section) at a resolution of 15×15 square microns. The iPP matrix (dark regions) surrounding the large rubber domains (bright regions) are arranged as intertwined-continuous or semi-continuous domains in which portions of the continuous phase are dispersed within the discontinuous rubber phase, and portions in which the dispersed rubber phase are dispersed within the continuous IPP phase. The plurality of dispersed domains shown in FIG. 1B have a size on the order of a few microns. As shown in FIG. 1C, higher magnification AFM at 2.5×2.5 square microns of the dispersed rubber domains reveals a nanostructure having a bi-continuous morphology comprising both the iPP phase and the rubber phase, arranged as intertwined essentially continuous domains. As shown in FIG. 1D, higher magnification AFM of 500 nm×500 nm reveals a nanostructure with bi-continuous morphology comprising areas of the thermoplastic phase dispersed within the rubber phase, and areas in which the rubber phase is dispersed within the iPP thermoplastic phase, present as intertwined continuous domains within an area of less than 1 $\mu m^2$, preferably within an area of less than 500 $nm^2$, preferably within an area of less than 100 $nm^2$, or less. This hierarchical microstructure is a matter of first impression in TPV materials.

Accordingly, in embodiments of the invention, TPVs comprise a first thermoplastic phase and a second elastomeric rubber phase arranged in a bi-continuous nanostructure morphology throughout the composition comprising a plurality of portions in which the first phase is dispersed within the second phase within an area of less than 1 $\mu m^2$, and a plurality of portions in which the second phase is dispersed within the first phase within an area of less than 1 $\mu m^2$.

In embodiments of the present invention, TPVs comprise elastomeric rubber compositions that are melt miscible with the thermoplastic continuous phase. In embodiments, the thermoplastic phase is polypropylene, preferably isotactic polypropylene (IPP) homopolymer. The elastomeric rubber phase preferably comprises a butene-ethylene diene terpolymer (BEDM) comprising from about 10 wt % to 40 wt % ethylene. In embodiments, the BEDM rubber is essentially amorphous. In embodiments, the BEDM rubber is produced using a catalyst which does not incorporate stereo-regular butene ($C_4$) sequences in appreciable amounts, if at all, such that the BEDM rubber is completely amorphous. In one or more embodiments, elastomeric rubber second phase comprises less than 0.1 wt % propylene, preferably is essentially free of propylene or comprises no propylene residues.

Numerous factors are known to affect the miscibility of rubber components with thermoplastics. (See Weimann, P A et al. (1997) "Phase Behavior of Isotactic Polypropylene-Poly(ethylene/ethylethylene) Random Copolymer Blends," *Macromolecules*, V. 30(12), pp. 3650-3657; Thomann, Y. et al. (1998) "Investigation of Morphologies of One- and Two-Phase Blends of Isotactic Poly(propene) with Random Poly(ethane-co-1-butene), *Macromolecules*, v. 31(16), pp. 5441-5449; and Mader, D. et al. (1999) "Influence of Comonomer Incorporation on Morphology and thermal and Mechanical Properties of Blends Based upon Isotactic Metallocene-Polypropene and Random Ethene/1-Butene Copolymers," *Journal of Applied Polymer Science*, v. 74(4), pp. 838-848, the contents of which are incorporated by reference herein. It has been discovered that BEDM terpolymers comprising from about 10 wt % to 40 wt % ethylene are fully miscible with iPP. After dynamic vulcanization and cooling below the iPP crystallization temperature (Tc), these melt miscible iPP/BEDM blends produce the submicron BEDM domains having an intertwined, bi-continuous nanostructure morphology throughout the composition comprising a plurality of portions in which the first phase is dispersed within the second phase within an area of less than 1 $\mu m^2$, and a plurality of portions in which the second phase is dispersed within the first phase within an area of less than 1 $\mu m^2$. This newly discovered form of domains produced by the instant TPVs is thought to render compositions having superior elastic properties compared to conventional TPVs.

In embodiments, the BEDM terpolymers comprise relatively high levels of diene, typically ethylidene norbornene. In embodiments, the rubber phase comprises greater than about 5 wt % diene. In embodiments, the rubber phase comprises greater than about 5 wt % diene, preferably greater than 7 wt % diene, preferably greater than 10 wt % diene, and less than about 20 wt % diene, preferably less than 15 wt % diene, preferably from about 5 wt % diene to less than or equal to about 10 wt % diene.

In embodiments, the diene component comprises from 4 to 20 carbon atoms. Suitable dienes include 5-ethylidene-2-norbornene (ENB), 1,4-hexadiene, 1,6 octadiene, 5-methyl-1,4-hexadiene, 3,7-dimethyl-1,6-octadiene, dicyclopentadiene (DCPD), norbornadiene, 5-vinyl-2-norbornene (VNB), divinylbenzene (DVB), and combinations thereof.

It has been discovered that the moduli of the BEDM terpolymers are dependent on the ethylene content. Applicant has further discovered that by lowering the ethylene content of the BEDM rubber, the plateau modulus of the BEDM terpolymer is reduced. Additionally, by using butene instead of propylene, which is typically utilized in TPVs as EPDM, the modulus of the rubber is further reduced. Applicant has discovered that TPVs prepared with butene-rich BEDM terpolymers as the rubber phase, i.e., BEDM terpolymers comprising greater than or equal to about 50 wt %, preferably from about 50 wt % to 80 wt % butene, a TPV having significantly lower moduli values relative to conventional EPDM TPVs is produced.

Applicant further discovered that the amorphous BEDM rubber polymers having an ethylene composition in the range of 10 to 40 wt % are fully melt miscible with iPP. The melt miscible iPP/BEDM blends produce the submicron BEDM domains after dynamic vulcanization and cooling below the iPP crystallization temperature (Tc). Such low size and bi-continuous interwoven domains have been found to render superior elastic properties compared to conventional TPVs.

In one or more embodiments, the continuous phase of the thermoplastic vulcanizate composition comprises propylene. In some embodiments, the continuous phase consists of, or consists essentially of polypropylene, preferably isotactic polypropylene. In alternative embodiments, the continuous phase comprises a propylene copolymer or terpolymer, further comprising from about 1 to about 45 wt % of a $C_4$-$C_{22}$ monomer. Non-limiting examples of α-olefins comonomers include, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

In embodiments the thermoplastic vulcanizate composition includes greater than or equal to about 10 wt % of the elastomeric rubber phase, preferably from about 10 wt % to about 80 wt % of a dispersed phase, preferably from about 10 wt % to about 50 wt %, more preferably from about 10 wt % to about 30 wt %, based on the total amount of the composition. In embodiments, the dispersed rubber phase of the thermoplastic vulcanizate composition comprises an ethylene-$C_4$-$C_8$ alpha-olefin terpolymer. In embodiments, as discussed herein, the rubber terpolymer comprises ethylene and butene. In embodiments, the dispersed phase may comprise ethylene, butene, and one or more $C_5$ or higher monomer. In a preferred embodiment, the dispersed phase consists of or consists essentially of ethylene-butene diene terpolymer comprising from about 10 wt % up to about 40 wt % ethylene. In embodiments, the dispersed rubber phase comprises less than about 15 wt %, preferably less than 1 wt %, preferably less than 0.1 wt % polypropylene, based on the total amount of the dispersed phase present.

It is believed these previously unknown small interwoven domains are due to the miscibility of iPP and the rubber in the melt. In contrast, ethylene-propylene diene terpolymers, typical used as the rubber component in the art are highly immiscible with iPP.

In embodiments, the elastomeric rubber phase has a number averaged molecular weight of greater than or equal to about 80,000 g/mol, preferably greater than or equal to about 100,000 g/mol, with greater than or equal to about 150,000 g/mol being preferred. In embodiments the elastomeric rubber phase has a number averaged molecular weight of less than or equal to about 500,000 g/mol, preferably of less than or equal to about 400,000 g/mol, preferably of less than or equal to about 300,000 g/mol. In embodiments, the elastomeric rubber phase is an amorphous terpolymer, preferably an amorphous ethylene-butene-diene terpolymer.

Dynamical-thermal mechanical analysis (DMTA) of conventional thermoplastic vulcanizate compositions typically show a double peak in the tan delta analysis, wherein the peaks represent the two glass transitions (Tg) of the phase separated iPP and the dispersed rubber phase. In contrast, DMTA analysis of thermoplastic vulcanizate compositions according to embodiments of the instant disclosure show a single, broad transition in the tan delta analysis from −100° C. to 0° C., when determined according to ASTM D4440 (i.e., over a temperature range from below the lowest glass transition temperature of the components of the composition, to a temperature above the highest glass transition temperature of the components of the composition), indicating a very strong interaction between the two phases.

In embodiments, the thermoplastic vulcanizate may further comprise paraffinic oils, also referred to in the art as extender oil, and may further comprise one or more additives including, but not limited to, carbon black, plasticizers, processing aids such as fatty acids, waxes, and the like, antioxidants, curatives, fillers including calcium carbonate, clay, silica and the like, antiozonants, tackifiers, scorch inhibiting agents, and other additives known in the art.

In embodiments, the thermoplastic vulcanizate further comprising greater than 1 part per hundred rubber (phr) of a paraffinic oil. In embodiments, the thermoplastic vulcanizate comprises greater than about 10 phr, preferably greater than about 50, and preferably less than about 500, preferably less than about 200 phr paraffinic oil. In embodiments, the thermoplastic vulcanizate comprises from 1 part per hundred rubber to 200 parts per hundred rubber of a paraffinic oil, based on the total weight of the elastomeric rubber composition present.

Extender oils suitable for use herein include naphthenic and/or paraffinic compounds, preferably those which are a liquid at 25° C. Exemplary synthetic processing oils include polylinear alpha-olefins, polybranched alpha-olefins, and hydrogenated polyalphaolefins. The compositions of this invention may include organic esters, alkyl ethers, or combinations thereof. U.S. Pat. Nos. 5,290,886 and 5,397,832 are incorporated herein in this regard. The addition of certain synthetic processing oils are polylinear alpha-olefins, polybranched alpha-olefins, and hydrogenated polyalphaolefins and/or low to medium molecular weight alkyl esters and alkyl ether esters to the compositions of the invention may dramatically lower the glass transition temperature (Tg) of the polyolefin and rubber components, and of the overall composition, and may improve the low temperatures properties, particularly flexibility and strength. These alkyl esters and alkyl ether esters generally have a molecular weight that is generally less than about 10,000 g/mol. It is believed that the improved effects may be achieved by the partitioning of the ester into both the polyolefin and rubber components of the compositions. Particularly suitable esters include monomeric and oligomeric materials having an average molecular weight below about 2,000 g/mol, and preferably below about 600 g/mol. The ester or synthetic oil should be compatible, or miscible, with both the polyolefin and rubber components of the composition; i.e. that it mixes with the other components to form a single phase.

The instant thermoplastic vulcanizate may likewise include a polymeric processing additive. The processing additive employed is a polymeric resin that has a very high melt flow index. These polymeric resins include both linear and branched molecules that have a melt flow rate that is greater than about 500 dg/min, more preferably greater than about 750 dg/min, even more preferably greater than about 1,000 dg/min, still more preferably greater than about 1,200 dg/min, and still more preferably greater than about 1,500 dg/min. Melt flow rate is a measure of how easily a polymer flows under standard pressure, and is measured by using ASTM D-1238 at 230° C. and 2.16 kg load. The thermoplastic elastomers of the present invention may include mixtures of various branched or various linear polymeric processing additives, as well as mixtures of both linear and branched polymeric processing additives. Reference to polymeric processing additives will include both linear and branched additives unless otherwise specified. The preferred linear polymeric processing additives are polypropylene homopolymers. The preferred branched polymeric processing additives include diene-modified polypropylene polymers. Thermoplastic vulcanizates that include similar processing additives are disclosed in U.S. Pat. No. 6,451,915, which is incorporated herein by reference.

In addition, the composition may also include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black, as well as organic and inorganic nanoscopic fillers. Fillers, such as carbon black, are preferably added in combination with a carrier such as polypropylene.

In certain embodiments, the thermoplastic vulcanizates may include acid scavengers. These acid scavengers are preferably added to the thermoplastic vulcanizates after the desired level of cure has been achieved. Preferably, the acid scavengers are added after dynamic vulcanization. Useful acid scavengers include hydrotalcites. Both synthetic and natural hydrotalcites can be used. An exemplary natural hydrotalcite can be represented by the formula $Mg_6Al_2(OH)_{1-6}CO_3.4H_2O$. Synthetic hydrotalcite compounds, which are believed to have the formula: $Mg_{4.3}Al_2(OH)_{12.6}CO_3.mH_2O$ or $Mg_{4.5}Al_2(OH)_{13}CO_{3.3}.5H_2O$, can be obtained under the tradenames DHT-4A™ or Kyowaad™ 1000 (Kyowa; Japan). Another commercial example is that available under the trade name Alcamizer™ (Kyowa). When employed, acid scavengers, such as hydrotalcite, may be employed in an amount from about 0.1 to about 5% by weight, preferably from about 0.2 to about 3% by weight, and more preferably from about 0.5 to about 1.0% by weight based on the total weight of the thermoplastic vulcanizate.

Those ordinarily skilled in the art will appreciate the appropriate quantities, types of cure systems, and vulcanization conditions required to carry out the vulcanization of the rubber. The rubber can be vulcanized by using varying amounts of curative, varying temperatures, and a varying time of cure in order to obtain the optimum crosslinking desired.

The curative is preferably employed in an amount equal to or in excess of 2, more preferably in excess of 3, even more preferably in excess of 3.5, still more preferably in excess of 4.0, even more preferably in excess of 4.5, and still more preferably in excess of 5 parts by weight per 100 parts by weight rubber; and the curative is preferably employed in an amount less than 10, preferably less than 9, more preferably less than 7.5, even more preferably less than 6.5, still more preferably less than 6.0, and even more preferably less than 5.5 parts by weight per 100 parts by weight rubber.

When utilized, stannous chloride is preferably employed in an amount equal to or in excess of 0.2, more preferably equal to or in excess of 0.25, even more preferably equal to or in excess of 0.3, still more preferably equal to or in excess of 0.4, and even more preferably equal to or in excess of 0.5 parts by weight per 100 parts by weight rubber; and the stannous chloride is preferably employed in an amount equal to or less than 2.0, preferably equal to or less than 1.5, preferably equal to or less than 0.9, preferably equal to or less than 0.85, more preferably equal to or less than 0.8, still more preferably equal to or less than 0.75, and even more preferably equal to or less than 0.7 parts by weight per 100 parts by weight rubber. Alternatively, the thermoplastic vulcanizates of this invention may include from 0.2 to 0.9, optionally from about 0.25 to about 0.85, and optionally from about 0.3 to about 0.8 parts by weight stannous chloride per 100 parts by weight rubber.

When utilized, zinc oxide is preferably employed in an amount equal to or in excess of 0.25, preferably equal to or in excess of 0.3, even more preferably equal to or in excess of 0.5, still more preferably in excess of 0.8, and even more preferably equal to or in excess of 1.0 parts by weight per 100 parts by weight rubber; and the zinc oxide is preferably employed in an amount equal to or less than 4.0, preferably equal to or less than 3.0, and more preferably equal to or less than 2.0, parts by weight per 100 parts by weight rubber. Alternatively, the thermoplastic vulcanizates of this invention may include from 0.25 to 4.0, optionally from about 0.3 to about 3.0, and optionally from about 0.5 to about 2.0 parts by weight zinc oxide per 100 parts by weight rubber.

Dynamic Vulcanization

The thermoplastic vulcanizates are preferably prepared by employing dynamic vulcanization techniques. Dynamic vulcanization refers to a vulcanization or curing process for a rubber contained in a blend that includes the rubber and at least one thermoplastic resin. The rubber is vulcanized under conditions of shear and extension at a temperature at or above the melting point of the thermoplastic resin. The rubber is thus simultaneously crosslinked and dispersed within the thermoplastic resin matrix at dynamic vulcanization conditions which include the desired level of cure, rubber to plastic viscosity ratio, intensity of mixing, residence time, and temperature. Additives are preferably present within the composition when the rubber is dynamically vulcanized.

In one embodiment, the dynamic vulcanization of the rubber is carried out by employing a curative and optionally, other additives within a continuous process that undergoes relatively high shear as defined in U.S. Pat. No. 4,594,390, which is incorporated herein by reference. In particularly preferred embodiments, the mixing intensity and residence time experienced by the ingredients during dynamic vulcanization is preferably greater than that proposed in U.S. Pat. No. 4,594,390. Dynamic vulcanization may occur within a variety of mixing equipment including batch mixers such as Brabender mixers and continuous mixers such as multiple-screw extruders. The various equipment that can be employed includes those described in "Mixing Practices Incorporating Twin-Screw Extruders," by Andersen; and "Intermeshing Twin-Screw Extruders" by Sakai, Chapters 20 and 21, *Mixing and Compounding Of Polymers: Theory And Practice* by Ica Manas-Zloczower and Zebev Tadmor, New York: Hanser, (1994), which is incorporated herein by reference.

In certain embodiments, certain ingredients are added after dynamic vulcanization or after phase inversion. As those skilled in the art appreciate, dynamic vulcanization may begin by including a greater volume fraction of rubber than thermoplastic resin. As such, the thermoplastic resin may be present as the discontinuous phase when the rubber volume fraction is greater than that of the volume fraction of the thermoplastic resin. As dynamic vulcanization proceeds, the viscosity of the rubber increases, and phase inversion occurs under dynamic mixing. In other words, upon phase inversion, the thermoplastic resin phase becomes the continuous phase.

In one embodiment, the acid scavengers (e.g., hydrotalcite) are added after about 50%, preferably 75%, and more preferably about 90% of the curative is consumed. In preferred embodiments, the acid scavengers are added after the curative is completely consumed or after full cure, where applicable, has been achieved. In one embodiment, the acid scavenger can be added with a carrier. For example, the acid scavenger can be blended with an oil or with a thermoplastic resin such as polypropylene and the mixture added to the thermoplastic vulcanizate.

Other ingredients, such as additional thermoplastic resins, additional thermoplastic vulcanizates, processing additives, and/or pigments, may likewise be added after dynamic vulcanization or phase inversion.

The addition of additional ingredients after dynamic vulcanization can be accomplished by employing a variety of techniques. In one embodiment, the additional ingredients can be added while the thermoplastic vulcanizate remains in its molten state from the dynamic vulcanization process. For example, the additional ingredients can be added downstream of the location of dynamic vulcanization within a process that employs continuous processing equipment, such as a single or twin-screw extruder. In other embodiments, the thermoplastic vulcanizate can be "worked-up" or pelletized, subsequently melted, and the additional ingredients can be added to the molten thermoplastic vulcanizate product. This latter process may be referred to as a "second pass" addition of the ingredients.

In embodiments, despite the fact that the rubber may be partially or fully cured, the compositions of this invention can be processed and reprocessed by conventional plastic processing techniques such as extrusion, injection molding, and compression molding.

In one or more embodiments, the rubber is completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628. Preferably, the rubber has a degree of cure where not more than 15 weight percent, preferably not more than 10 weight percent, more preferably not more than 5 weight percent, and still more preferably not more than 3 weight percent is extractable by cyclohexane at 23° C. as described in U.S. Pat. Nos. 5,100,947 and 5,157,081, which are incorporated herein by reference. Alternatively, the rubber has a degree of cure such that the crosslink density is preferably at least $4 \times 10^{-5}$, more preferably at least $7 \times 10^{-5}$, and still more preferably at least $10 \times 10^{-5}$ moles per milliliter of rubber. See also Ellul, M. D. et al. (1995) "Crosslink Densities and Phase Morphologies in Dynamically Vulcanized TPEs," *Rubber Chemistry and Technology*, v. 68(4), pp. 573-584.

Molded Products

The thermoplastic vulcanizate compositions described herein may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the compositions described herein may be shaped into desirable end use articles by any suitable means known in the art. Suitable examples include thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers.

Blow molding is described in more detail in, for example, *Concise Encyclopedia of Polymer Science and Engineering* 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or by calendaring.

Non-Woven Articles and Fibers

The thermoplastic vulcanizate compositions described herein may also be used to prepare nonwoven fabrics and fibers in any nonwoven fabric and fiber making process, including but not limited to, melt blowing, spunbonding, film aperturing, and staple fiber carding. Examples include continuous filament processes, spunbonding processes, and the like. The spunbonding process, as is well known in the art, involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

The thermoplastic vulcanizate composition according to embodiments disclosed herein are useful in a wide variety of applications where a low flexural modulus is desired. Examples of those applications include automotive overshoot parts (e.g., door handles and skins such as dashboard, instrument panel and interior door skins), airbag covers, toothbrush handles, shoe soles, grips, skins, toys, appliance moldings and fascia, gaskets, furniture moldings and the like.

Other articles of commerce that can be produced from this invention include but are not limited by the following examples: awnings and canopies—coated fabric, tents/tarps coated fabric covers, curtains extruded soft sheet, protective cloth coated fabric, bumper fascia, instrument panel and trim skin, coated fabric for auto interior, geo textiles, appliance door gaskets, liners/gaskets/mats, hose and tubing, syringe plunger tips, light weight conveyor belt PVC replacement, modifier for rubber concentrates to reduce viscosity, single ply roofing compositions, recreation and sporting goods, grips for pens, razors, toothbrushes, handles, and the like. Other articles include marine belting, pillow tanks, ducting, dunnage bags, architectural trim and molding, collapsible storage containers, synthetic wine corks, IV and fluid administration bags, examination gloves, and the like.

Exemplary articles made using the polymeric compositions described herein include cookware, storage ware, toys, medical devices, sterilizable medical devices, sterilization containers, sheets, crates, containers, packaging, wire and cable jacketing, pipes, geomembranes, sporting equipment, chair mats, tubing, profiles, instrumentation sample holders and sample windows, outdoor furniture, e.g., garden furniture, playground equipment, automotive, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles. In particular, the polymeric compositions described herein are useful for producing "soft touch" grips in products such as personal care articles such as toothbrushes, etc.; toys; small appliances; packaging; kitchenware; sport and leisure products; consumer electronics; PVC and silicone rubber replacement medical tubing; industrial hoses; and shower tubing.

Process

In embodiments of the invention, a process to produce a thermoplastic vulcanizate composition according to one or more embodiments or combinations of embodiments, comprises the steps of combining:

i) a first component comprising propylene;

ii) from 10 wt % to 80 wt % of a second elastomeric rubber component comprising from about 10 wt % to about 40 wt % ethylene and from about 5 wt % to about 10 wt % of a conjugated diene having from 4 to 12 carbon atoms and from about 50 wt % to about 85 wt % of a $C_4$-$C_8$ alpha olefin; and iii) from about 0.1 wt % to about 10 wt % of a curative system, based on the total weight of the composition, under melt conditions to form a melt mixture in which the first component and the second component are fully melt miscible. The composition is then subjected to conditions which dynamically vulcanize the composition to at least partially cure, i.e., crosslink, the elastomeric rubber component; followed by cooling the melt mixture to form the thermoplastic vulcanizate composition comprising an intertwined bi-continuous nanostructure morphology throughout the composition comprising a plurality of portions in which the first phase is dispersed within the second phase within an area of less than 1 $\mu m^2$, and a plurality of portions in which the second phase is dispersed within the first phase within an area of less than 1 $\mu m^2$.

In embodiments the process may further comprise combining from 1 part per hundred rubber to 200 parts per hundred rubber of a paraffinic or other extender oil, and optionally other components, with the first component, with the second component, with both the first and the second component under melt conditions, along with the curative system, and/or after dynamic vulcanization of the composition, wherein the concentration is based on the total amount of the elastomeric rubber composition present.

EMBODIMENTS

Accordingly, the instant disclosure relates to the following embodiments:

E1. A thermoplastic vulcanizate composition, comprising a first phase bi-continuously intertwined with from about 10 wt % to 80 wt % of a second phase throughout the composition, and from about 0.1 wt % to about 10 wt % of a curative system, the first phase comprising polypropylene and the second phase comprising an at least partially cured elastomeric rubber composition, comprising from about 10 wt % to about 40 wt % ethylene, from about 5 wt % to about 10 wt % of a conjugated diene having from 4 to 12 carbon atoms, and from about 50 wt % to about 85 wt % of a $C_4$-$C_8$ alpha olefin, based on the total weight of the elastomeric rubber composition present.

E2. The composition of embodiment E1, wherein the elastomeric rubber composition comprises about 50 wt % to about 70 wt % of the $C_4$-$C_8$ alpha olefin, based on the total weight of the elastomeric rubber composition present.

E3. The composition of embodiment E1 or E2, wherein the elastomeric rubber composition comprises from about 10 wt % to about 40 wt % ethylene, from about 5 wt % to about 10 wt % ethylidene norbornene, and from about 50 wt % to about 85 wt % of 1-butene, based on the total weight of the elastomeric rubber composition present.

E4. The composition of embodiment E3, wherein the elastomeric rubber composition has a number averaged molecular weight of about 100,000 g/mol to about 400,000 g/mol.

E5. The composition of any one of embodiments E1 through E4, wherein the elastomeric rubber composition comprises a melt index of less than 5 g/10 min @230° C./2.16 kg, when determined according to ASTM D 1238.

E6. The composition of any one of embodiments E1 through E5, wherein the first and second phases form a bi-continuous nanostructure morphology throughout the composition comprising a plurality of portions in which the first phase is dispersed within the second phase within an area of less than 1 $\mu m^2$, and a plurality of portions in which the second phase is dispersed within the first phase within an area of less than 1 $\mu m^2$.

E7. The composition of any one of embodiments E1 through E6, wherein the first phase consists essentially of isotactic polypropylene homopolymer and the second phase consists essentially of amorphous butene-ethylene-ethylidene norbornene terpolymer comprising greater than or equal to about 10 wt % and less than or equal to about 40 wt % ethylene.

E8. The composition of any one of embodiments E1 through E7, comprising from about 10 wt % to about 50 wt % of the second phase, based on the total weight of the thermoplastic vulcanizate composition.

E9. The composition of any one of embodiments E1 through E8, wherein the first phase and the second phase are fully melt-miscible at a temperature above the melting points of both the first and the second phases.

E10. The composition of any one of embodiments E1 through E9, further comprising from 1 part per hundred rubber to 500 parts per hundred rubber of a paraffinic oil, based on the total weight of the elastomeric rubber composition present.

E11. The composition of any one of embodiments E1 through E9, further comprising from 1 part per hundred rubber to 200 parts per hundred rubber of a paraffinic oil, based on the total weight of the elastomeric rubber composition present.

E12. The composition of any one of embodiments E1 through E11, having a single glass transition temperature, when determined according to ASTM D4440.

E13. The composition of any one of embodiments E1 through E12, having a Shore A hardness of less than or equal to about 70, preferably less than or equal to about 60, preferably less than or equal to about 50 when determined according to ASTM D2240.

E14. The composition of any one of embodiments E1 through E13, having a flexural modulus of less than or equal to about 150 MPa, preferably less than or equal to about 75 MPa, preferably less than or equal to about 50 MPa, when determined according to ASTM D790.

E15. The composition of any one of embodiments E1 through E14, having an elongation at break of greater than or equal to about 400%, preferably greater than or equal to about 500%, when determined according to ASTM D638.

E16. The composition of any one of embodiments E1 through E15, having a tensile stress at break of less than 20 MPa, preferably less than 16 MPa, preferably less than 14 MPa, when determined according to ASTM D638.

E17. The composition of any one of embodiments E1 through E16, having a hysteresis of less than 2.5 MPa, preferably less than 2 MPa, preferably less than 1.5 MPa, when determined according to ASTM D624.

E18. The composition of any one of embodiments E1 through E17, having a tensile set of less than about 80%, preferably less than about 60%, preferably less than about 40%, when determined according to ASTM D624.

E19. The composition of any one of embodiments E1 through E18, wherein the second phase comprises less than 0.1 wt % propylene.

E20. An article comprising the thermoplastic vulcanizate composition according to any one of embodiments E1 through E19.

P1. A process to produce a thermoplastic vulcanizate composition comprising:
  A) combining:
    i) a first component comprising propylene;
    ii) from 10 wt % to 80 wt % of a second elastomeric rubber component comprising from about 10 wt % to about 40 wt % ethylene and from about 5 wt % to about 10 wt % of a conjugated diene having from 4 to 12 carbon atoms and from about 50 wt % to about 85 wt % of a $C_4$-$C_8$ alpha olefin; and
    iii) from about 0.1 wt % to about 10 wt % of a curative system, based on the total weight of the composition, under melt conditions to form a melt mixture in which the first component and the second component are fully melt miscible;
  B) dynamically vulcanizing the composition to at least partially cure the elastomeric rubber component; and
  C) cooling the melt mixture to form the thermoplastic vulcanizate composition comprising an intertwined bi-continuous nanostructure morphology throughout the composition comprising a plurality of portions in which the first phase is dispersed within the second phase within an area of less than 1 $\mu m^2$, and a plurality of portions in which the second phase is dispersed within the first phase within an area of less than 1 $\mu m^2$.

P2. The process according to embodiment P1, wherein the first phase consists essentially of isotactic polypropylene and the elastomeric rubber component comprises from about 10 wt % to about 40 wt % ethylene, from about 5 wt % to about 10 wt % ethylidene norbornene, from about 50 wt % to about 85 wt % of 1-butene, and less than 0.1 wt % propylene, based on the total weight of the elastomeric rubber component present.

P3. The thermoplastic vulcanizate thermoplastic elastomer of claim 1, further comprising greater than or equal to about 1 part per hundred rubber to less than or equal to about 500 parts per hundred rubber of a paraffinic oil, based on the total weight of the elastomeric rubber composition present.

P4. The process according to embodiment P1 or P2, further comprising combining from 1 part per hundred rubber to 200 parts per hundred rubber of a paraffinic oil with the first component and the second component under melt conditions, based on the total amount of the elastomeric rubber composition present.

P5. The process according to any one of embodiments P1 through P4, wherein the thermoplastic vulcanizate composition has a single glass transition temperature, when determined according to ASTM D4440.

P6. The process according to any one of embodiments P1 through P5, wherein the thermoplastic vulcanizate composition has a Shore A hardness of less than or equal to about 70, preferably less than or equal to about 60, preferably less than or equal to about 50 when determined according to ASTM D2240.

P7. The process according to any one of embodiments P1 through P6, wherein the thermoplastic vulcanizate composition has a flexural modulus of less than or equal to about 150 MPa, preferably less than or equal to about 75 MPa, preferably less than or equal to about 50 MPa, when determined according to ASTM D790.

P8. The process according to any one of embodiments P1 through P7, wherein the thermoplastic vulcanizate composition has an elongation at break of greater than or equal to about 400%, preferably greater than or equal to about 500%, when determined according to ASTM D638.

P9. The process according to any one of embodiments P1 through P8, wherein the thermoplastic vulcanizate composition has a tensile stress at break of less than 20 MPa, preferably less than 16 MPa, preferably less than 14 MPa, when determined according to ASTM D638.

P10. The process according to any one of embodiments P1 through P9 wherein the thermoplastic vulcanizate composition has a hysteresis of less than 2.5 MPa, preferably less than 2 MPa, preferably less than 1.5 MPa, when determined according to ASTM D624.

P11. The process according to any one of embodiments P1 through P10, wherein the thermoplastic vulcanizate composition has a tensile set of less than about 80%, preferably less than about 60%, preferably less than about 40%, when determined according to ASTM D624.

A1. An article produced by the process according to any one of embodiments P1 through P11.

A2. The article according to embodiment A1, comprising the composition according to any one of embodiments E1 thorough E20.

In order to demonstrate the practice of the present invention, the following examples have been prepared and tested. The examples should not, however, be viewed as limiting the scope of the invention.

EXAMPLES

For purposes herein the isotactic polypropylene PP5341 obtained from ExxonMobil

| ExxonMobil PP5341 Isotactic Polypropylene | | |
|---|---|---|
| Melt Mass-Flow Rate (MFR) (230° C./2.16 kg) | 0.83 g/10 min | ASTM D1238 |
| Density | 0.900 g/cm3 | |
| Tensile Strength at Yield 2.0 in/min (51 mm/min) | 32.0 MPa | ASTM D638 |
| Elongation at Yield (2.0 in/min (51 mm/min)) | 13% | ASTM D638 |
| Flexural Modulus - 1% Secant | | |
| 0.051 in/min (1.3 mm/min) | 1190 MPa | ASTM D790A |
| 0.51 in/min (13 mm/min) | 1390 MPa | ASTM D790B |
| Notched Izod Impact (73° F. (23° C.)) | 52 J/m | ASTM D256A |
| Deflection Temperature Under Load (DTUL) at 66 psi Unannealed | 83.7° C. | ASTM D648 |
| Deflection Temperature Under Load (DTUL) at 264 psi Unannealed | 51.9° C. | ASTM D648 |

For consistency the same extender oil Sunpar 150 (Sunoco, USA) was used to produce the exemplary compositions.

| Sunpar 150 | |
|---|---|
| Density at 15° C. | 0.869 |
| Viscosity at 40° C. cSt | 30.1 |
| Viscosity at 100° C. cSt | 5.3 |
| Flash point ° C. | 245 |
| Pour point ° C. | −9 |
| Aniline point ° C. | 111 |
| Refractive index 20-D | 1.484 |
| Refractive intercept | 1.045 |
| Color | 1.5 |
| VGC | 0.813 |
| Carbon type composition: | |
| CA % | 3 |
| CN % | 32 |
| CP % | 65 |

The catalyst OMC 1728, has the chemical structure shown below:

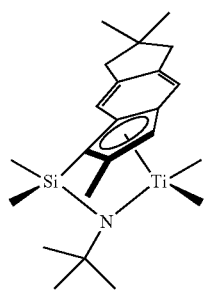

The activator used was dimethylaniliniumtetrakis(heptafluoronaphthyl)borate (also referred to herein as D9, MW=1145.3 g/mol). Catalyst solutions were prepared daily and used on the same day. The solution was prepared by dissolving 80 mg of the catalyst and 140 mg of the activator in 450 ml toluene (catalyst concentration=1.884×10-07 mol/ml, catalyst/activator (molar ratio)=0.98). This solution was pumped into the reactor through a designated dip-tube at a desired rate using an Isco pump. The OMC 1728 catalyst was selected because it was discovered not to incorporate any stereo-regular butene ($C_4$) sequences, rendering the polymer completely amorphous.

The composition was produced using the following mixing procedure:

The internal mixer is preheated to 180° C. and running at 81 rpm. The components are added sequentially in a preloading step:

1—BEDM

2—iPP

3—Paraffinic oil (Sunpar 150, HollyFrontier).

During this preloading step, most of the oil is added. The preloading step is then followed by addition of the Phenolic resin (RIO) and mixed to allow mixer torque and temperature to equilibrate. After equilibration, the rest of the components were added quickly:

5—$SnCl_2$;

6—ZnO; and

7—Paraffinic oil (Sunpar 150).

As part of this postloading step, 5 phr was added. The mixture was then mixed to allow mixer torque and temperature to equilibrate, followed by an additional 5 minutes of mixing. The blend was then unloaded from the mixture and allowed to cool to room temperature.

DMTA measurements were performed in a dynamic solid analyzer (RSA-G2, TA Instruments) using rectangular specimens (19 mm×5 mm×0.5 mm). Dynamic temperature ramps from −100° C. to 200° C. were carried out using frequency of 1 Hz and strain amplitude of 0.1%. The point (bend) test were performed at room temperature using ISO 178 standard method. Tensile tests were performed at room temperature using ISO 37 standard method. Tensile cyclic (hysteresis) tests were performed at room temperature using ISO 4664 standard test. Hardens Shore A was determined at room temperature using ISO 48 standard method.

Phenolic resin in oil (RIO)/SnCl$_2$/ZnO was used as the curative system employing laboratory stock at concentrations commonly used in the art. BEDM terpolymers were prepared having an ethylene composition in the range of 10 to 40 wt % using OMC 1728 catalyst.

The OMC 1728 catalyst was selected based on the discovery that the catalyst does not incorporate stereo-regular butene (C$_4$) sequences, thus rendering the polymer completely amorphous. This catalyst was also discovered to incorporate high levels of ENB effectively.

The properties of the BEDM terpolymers used herein are shown in Table 1.

TABLE 1

| BEDM: | Ethylene Wt % | DIENE (ENB) wt % | Melt Index |
|---|---|---|---|
| BEDM_A | 32% | 5.3% | 1.7 |
| BEDM_B | 18% | 5.6% | 1.37 |
| BEDM_C | 30% | 5.9% | 0.42 |
| BEDM_D | 23% | 6.2% | 0.76 |
| BEDM_E | 28% | 6.9% | 1 |

The BEDM elastomeric terpolymers were combined with isotactic polypropylene (PP5341, ExxonMobil) in a Brabender mixer at 81 rpm and 180° C. to form a homogenous melt. In the examples prepared with oil, the oil was added to the melt (pre), and/or along with the curative system (mid), and/or after dynamic vulcanization (post). Once the curative system was then added, dynamic vulcanization was allowed to occur, and the compositions were allowed to cool. The corresponding TPVs were then prepared for analysis. Sunpar 150 the extender oil. The components and relative concentrations of comparative and exemplary compositions are shown in Tables 2 and 3. A comparative TPV was produced using ExxonMobil Vistalon™ 3666 Ethylene-Propylene Terpolymer (EPDM) as the rubber phase.

TABLE 2 iPP/BEDM blend formulations

| Component | Comparative Example 1 | Example 1 | Example 2 | Example 3 | Example 4 | Example 5 |
|---|---|---|---|---|---|---|
| Comparative V3666 | 175 | | | | | |
| BEDM_A | | 175 | | | | |
| BEDM_B | | | 175 | | | |
| BEDM_C | | | | 175 | | |
| BEDM_D | | | | | 175 | |
| BEDM_E | | | | | | 175 |
| PP5341 | 97 | 97 | 97 | 97 | 97 | 97 |
| Pre-addition Oil (Sunpar 150) | 5 | 5 | 5 | 5 | 5 | 5 |
| RIO | 7 | 7 | 7 | 7 | 7 | 7 |
| SnCl$_2$ | 1 | 1 | 1 | 1 | 1 | 1 |
| ZnO | 1.95 | 1.95 | 1.95 | 1.95 | 1.95 | 1.95 |
| Post addition Oil (Sunpar 150) | 5 | 5 | 5 | 5 | 5 | 5 |
| Total phr | 291.95 | 291.95 | 291.95 | 291.95 | 291.95 | 291.95 |

TABLE 3 iPP/BEDM blend formulations

| Component | Example 6 | Example 7 | Example 8 | Example 9 | Example 10 | Example 11 |
|---|---|---|---|---|---|---|
| BEDM_E | 50 | 50 | 60 | 60 | 70 | 70 |
| PP5341 | 50 | 50 | 40 | 40 | 30 | 30 |
| Pre-addition Oil (Sunpar 150) | 0 | 50 | 0 | 60 | 0 | 70 |
| Mid addition Oil (Sunpar 150) | 0 | 23 | 0 | 28 | 0 | 33 |
| RIO | 3.5 | 3.5 | .2 | 4.2 | 4.9 | 4.9 |
| SnCl$_2$ | 0.5 | 0.5 | 0.6 | 0.6 | 0.7 | 0.7 |

TABLE 3-continued iPP/BEDM blend formulations

| Component | Example 6 | Example 7 | Example 8 | Example 9 | Example 10 | Example 11 |
|---|---|---|---|---|---|---|
| ZnO | 0.98 | 0.98 | 1.17 | 1.17 | 1.37 | 1.37 |
| Post addition Oil (Sunpar 150) | 2 | 2 | 2 | 2 | 2 | 2 |
| Total phr | 106.98 | 179.98 | 107.97 | 195.97 | 108.97 | 211.97 |

As shown in FIG. 1, AFM micrographs were then acquired of the Comparative Example 1 (FIG. 1A) and Example 6 at three different levels of magnification (FIGS. 1B-1D). As the AFM micrographs of FIGS. 1A and 1B show, at a resolution of 15×15 square microns the iPP matrix (dark regions) surrounding the large rubber domains (bright regions) with sizes in the order of a few microns. As shown in FIGS. 1C and 1D, higher levels of magnification of the rubber domains of the exemplary compositions reveal a nanostructure with bi-continuous morphology consisting of iPP and BEDM intertwined in continuous domains. To our knowledge this hierarchical microstructure has not been observed before in TPV materials. This inventive feature is further highlighted when compared to the microstructure of the comparative example, which is a conventional TPV.

Figure 2A:
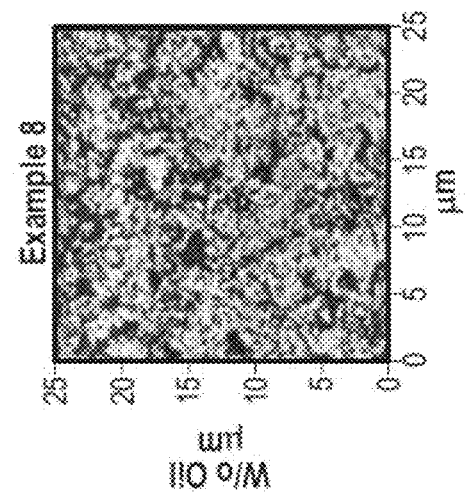
FIG. 2A is a photograph of an AFM micrograph of thermoplastic vulcanizate composition sample without paraffinic oil according to embodiments of the invention.
Figure 2D:
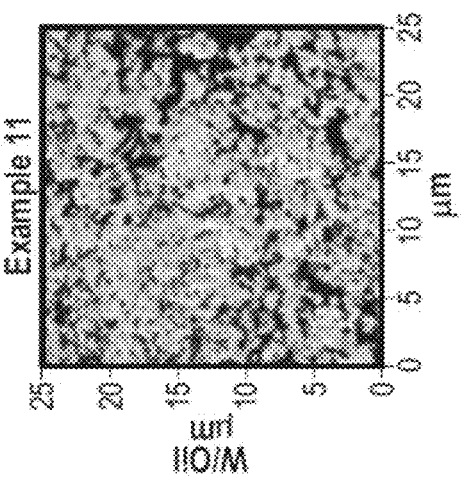
FIG. 2D is a photograph of an AFM micrograph of the thermoplastic vulcanizate composition of FIG. 2C having paraffinic oil according to embodiments of the invention.
Figure 2B:
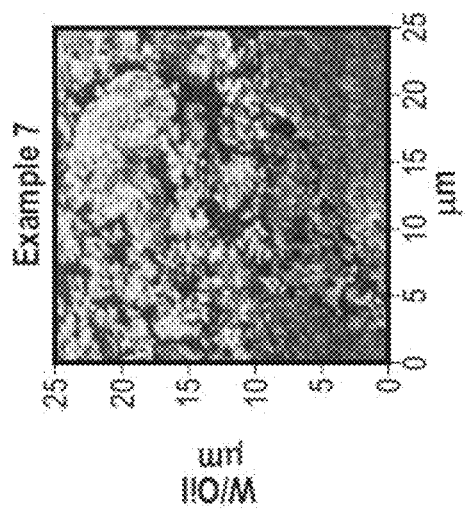
FIG. 2B is a photograph of an AFM micrograph of the thermoplastic vulcanizate composition of FIG. 2A having paraffinic oil according to embodiments of the invention.
Figure 2E:
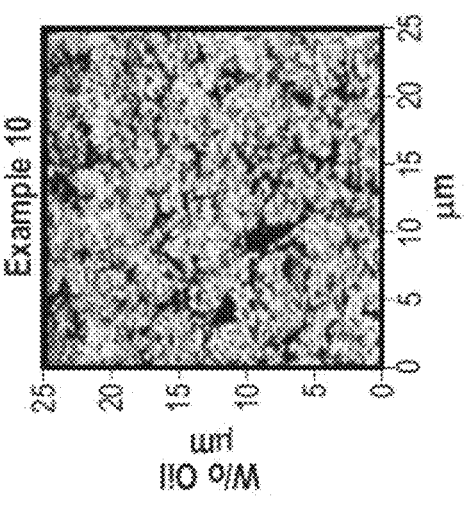
FIG. 2E is a photograph of an AFM micrograph of thermoplastic vulcanizate composition sample without paraffinic oil according to embodiments of the invention.
Figure 2C:
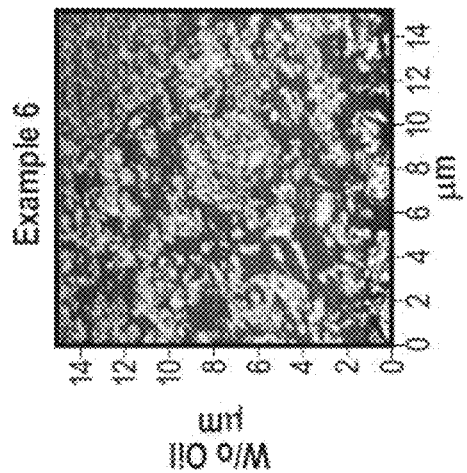
FIG. 2C is a photograph of an AFM micrograph of thermoplastic vulcanizate composition sample without paraffinic oil according to embodiments of the invention.
Figure 2F:
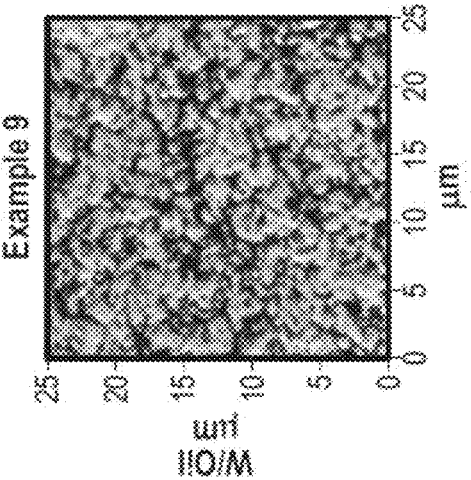
FIG. 2F is a photograph of an AFM micrograph of the thermoplastic vulcanizate composition of FIG. 2E having paraffinic oil according to embodiments of the invention.
Figure 3A:
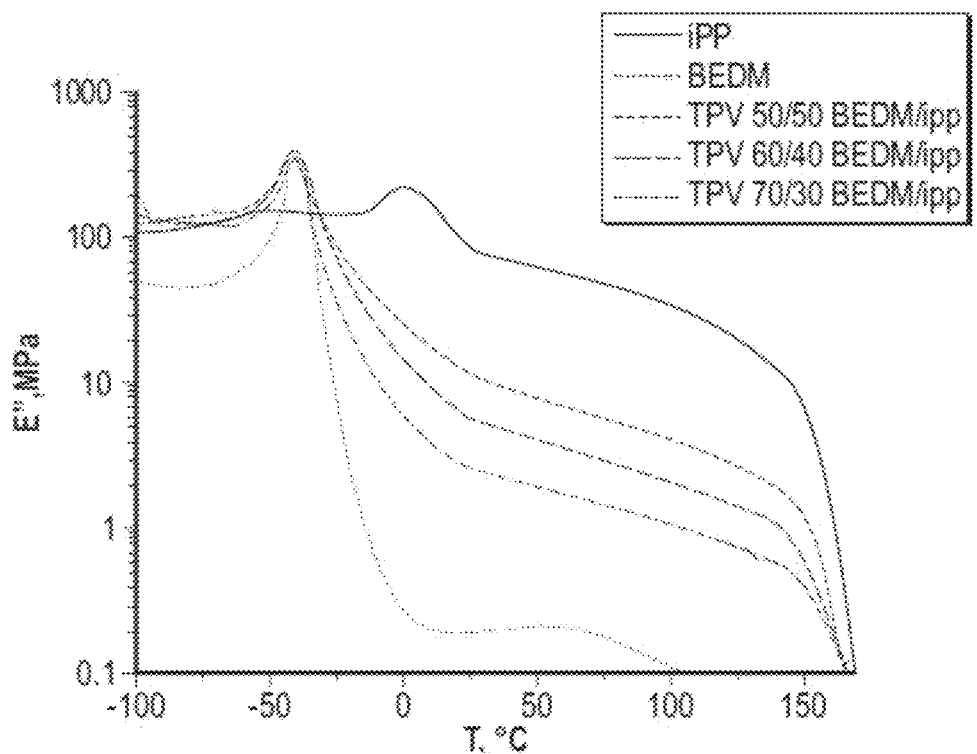
FIG. 3A is a graph showing dynamic loss modulus data of comparative and inventive thermoplastic vulcanizate composition sample without paraffinic oil according to embodiments of the invention.
Figure 3B:
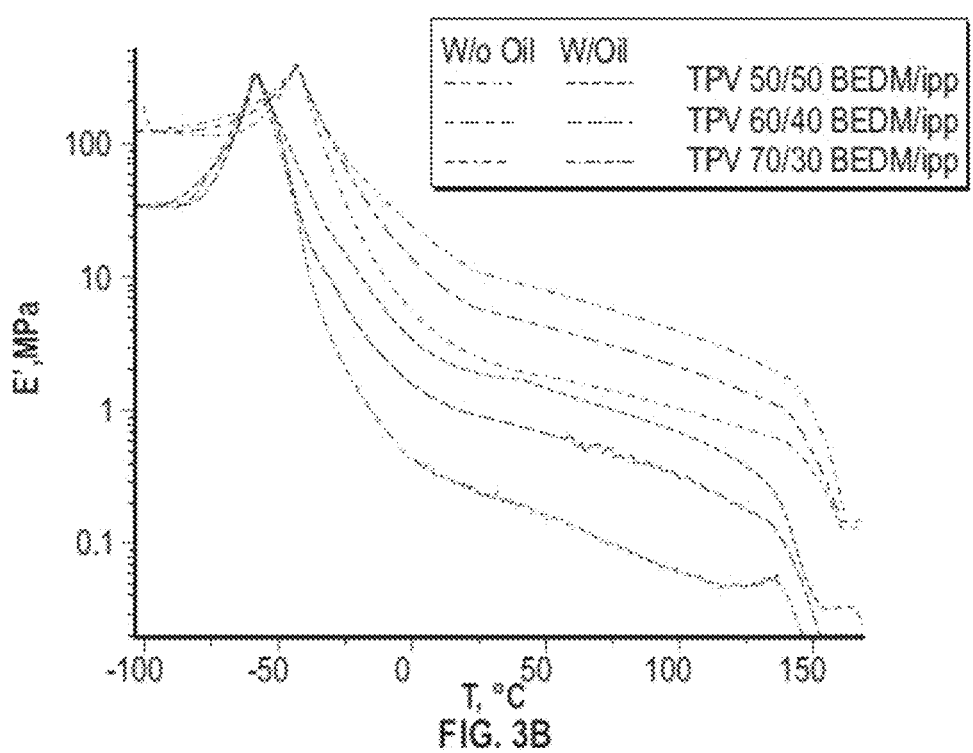
FIG. 3B is a graph showing dynamic loss modulus data of the inventive thermoplastic vulcanizate composition samples with and without paraffinic oil according to embodiments of the invention.
Figure 3C:
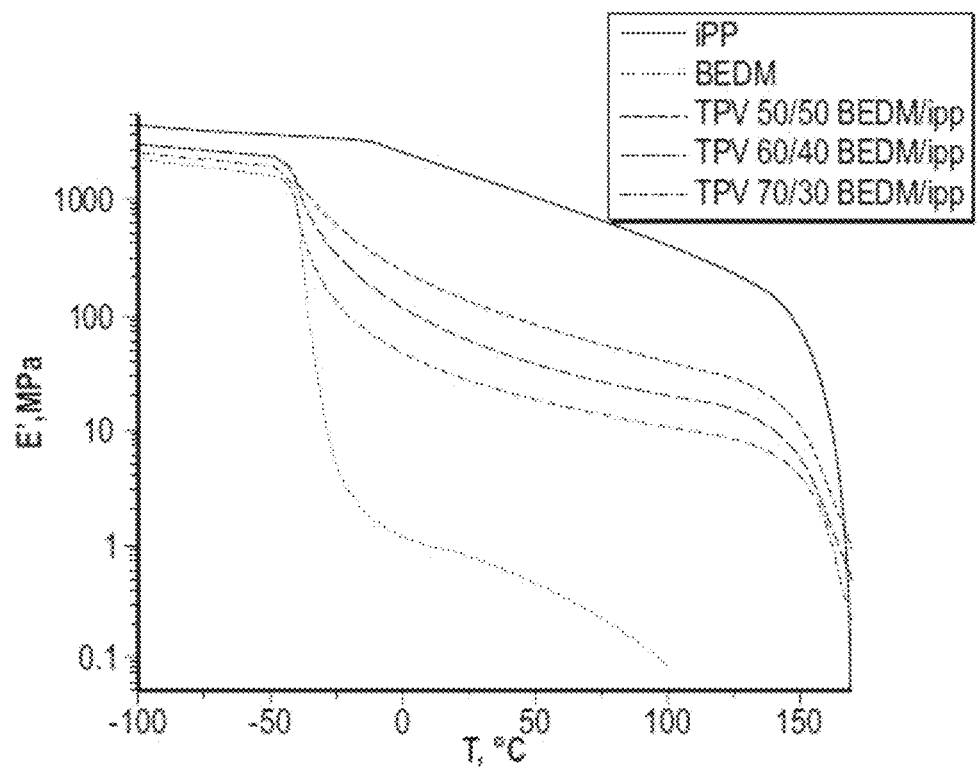
FIG. 3C is a graph showing dynamic elastic modulus data of comparative and inventive thermoplastic vulcanizate composition sample without paraffinic oil according to embodiments of the invention.
Figure 3D:
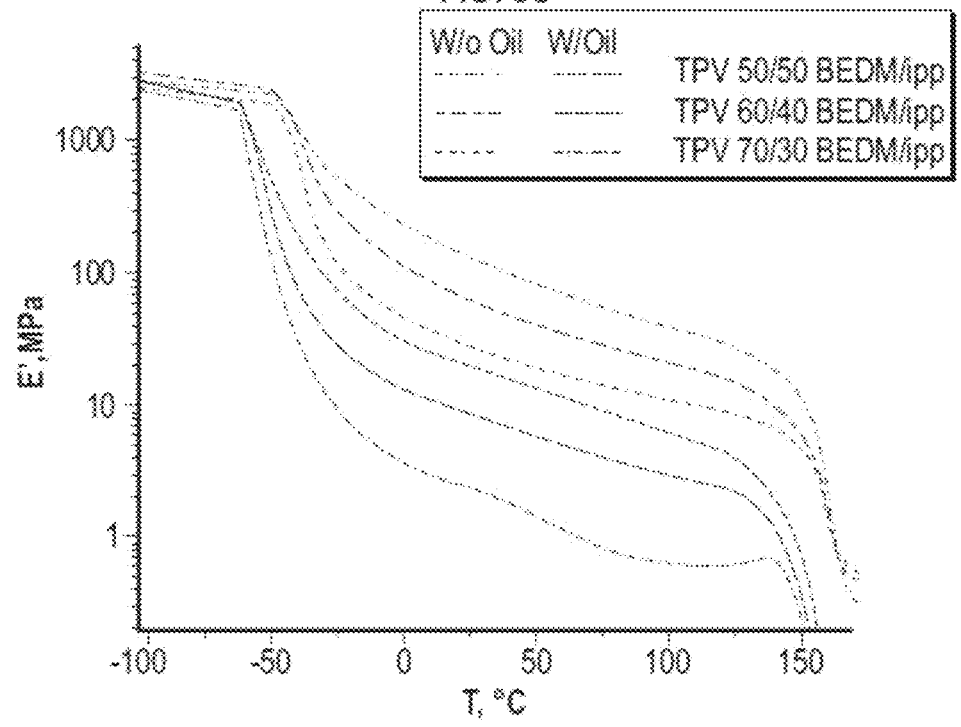
FIG. 3D is a graph showing dynamic elastic modulus data of the inventive thermoplastic vulcanizate composition sample with and without paraffinic oil according to embodiments of the invention.

FIGS. 2A, 2C, and 2E show AFM micrographs of examples 6, 8, and 10, respectively, without oil. FIGS. 2B, 2D, and 2F show AFM micrographs of examples 7, 9, and 11, respectively, which contain oil. As the figures show, regardless of the amount of oil, if any in the composition, the intertwined bi-continuous nanostructure is maintained.

Thermal Analysis

DMTA measurements of the EBDM TPVs (Table 3) are shown in FIGS. 3A-3D. These data include comparative data of the neat EBDM and iPP. As these data show, the glass transition of the blends is dominated by the rubber phase. This unique property of the inventive TPVs allows the use of these materials in low temperature applications. As these data further confirm, the glass transition Tg of the composition can be further reduced by the addition of oil.

The glass transition temperature Tg vs. the wt % of the EBDM of these examples is shown in Table 4 below.

TABLE 4

|  | Tg (° C.) |
|---|---|
| PP5341 | 0 |
| BEDM | −40 |
| Example 6 | −40 |
| Example 7 | −55 |
| Example 8 | −40 |
| Example 9 | −55 |
| Example 10 | −40 |
| Example 11 | −60 |

Mechanical Analysis

The Shore A hardness and Flexural Modulus of the exemplary BEDM TPVs are shown in Table 5 below.

TABLE 5

|  | Shore A Hardness | Flex Mod (Secant 1%) |
|---|---|---|
| Comparative V3666 | 91 | 210 |

TABLE 5-continued

|  | Shore A Hardness | Flex Mod (Secant 1%) |
|---|---|---|
| Example 6 | 90 | 120 |
| Example 7 | 69 | 20 |
| Example 8 | 85 | 60 |
| Example 9 | 55 | 10 |
| Example 10 | 78 | 25 |
| Example 11 | 42 | 5 |

As these data show, the hardness decreases with rubber content and oil content. Accordingly, the inventive TPV compositions can be prepared from very low hardness for elastic grades, to a higher hardness for plastic applications. The flexural modulus data confirm that the inventive TPVs are very soft, which is thought to be due to the nanostructure morphology in combination with the relatively high rubber content and the inherently low modulus of the BEDM rubber.

Figure 4:
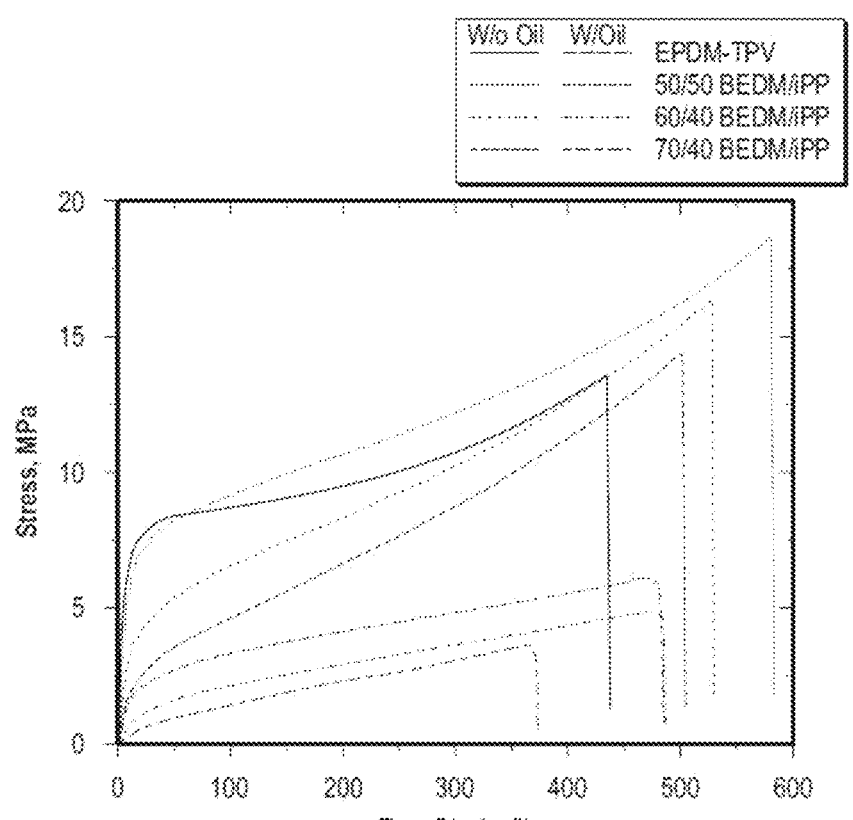
FIG. 4 is a graph showing elastic properties as a function of elastomeric rubber component content and oil content of inventive thermoplastic vulcanizate compositions according to embodiments of the invention.
Figure 5A:
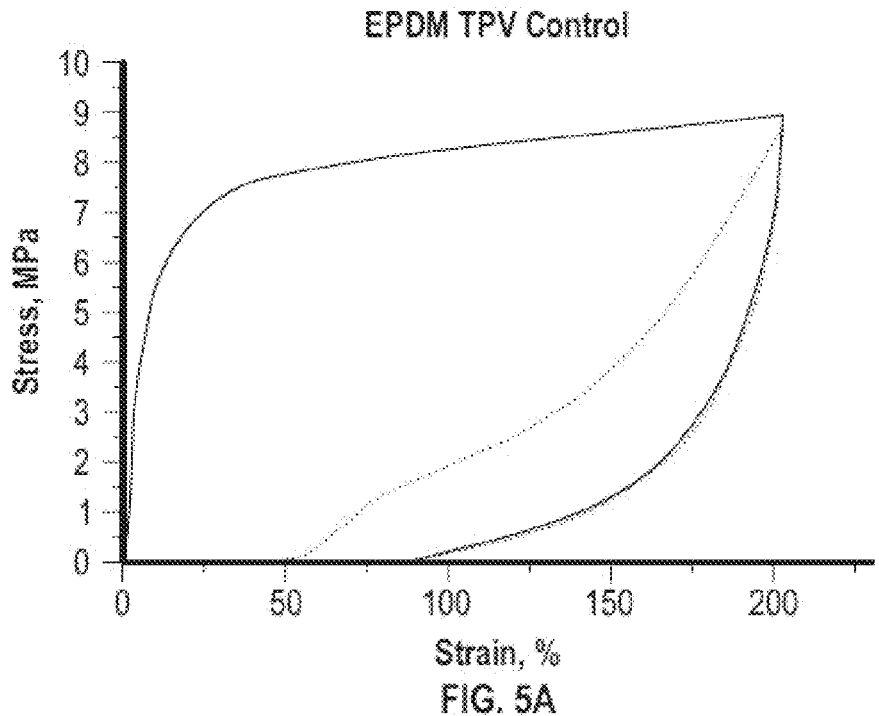
FIG. 5A is a stress vs. percent strain hysteresis graph of a comparative thermoplastic vulcanizate composition.
Figure 5B:
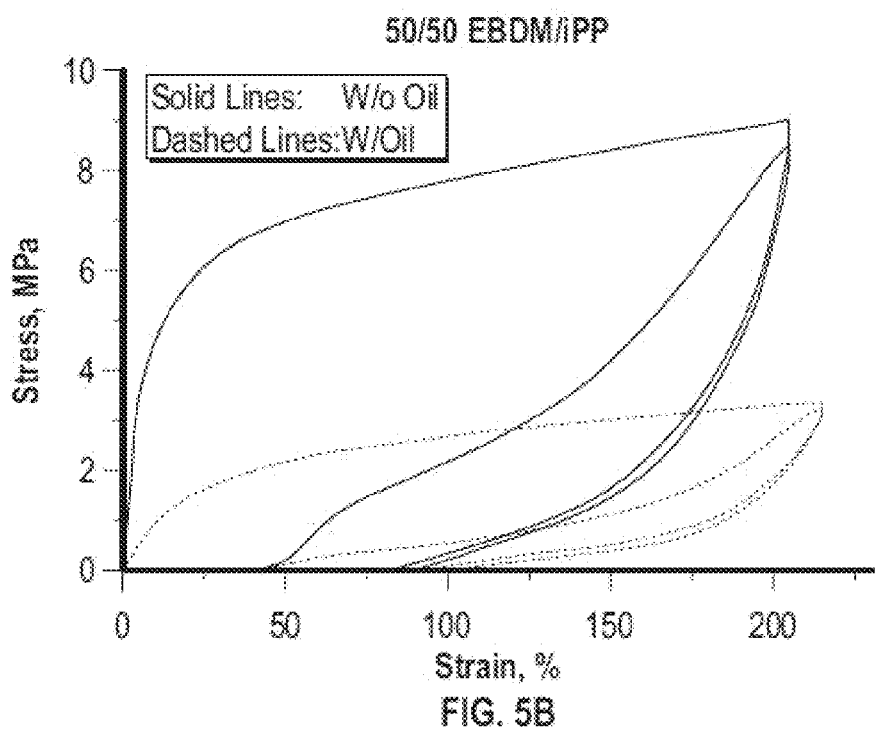
FIG. 5B is a stress vs. percent strain hysteresis graph of an inventive thermoplastic vulcanizate composition with and without paraffinic oil according to embodiments of the invention.
Figure 5C:
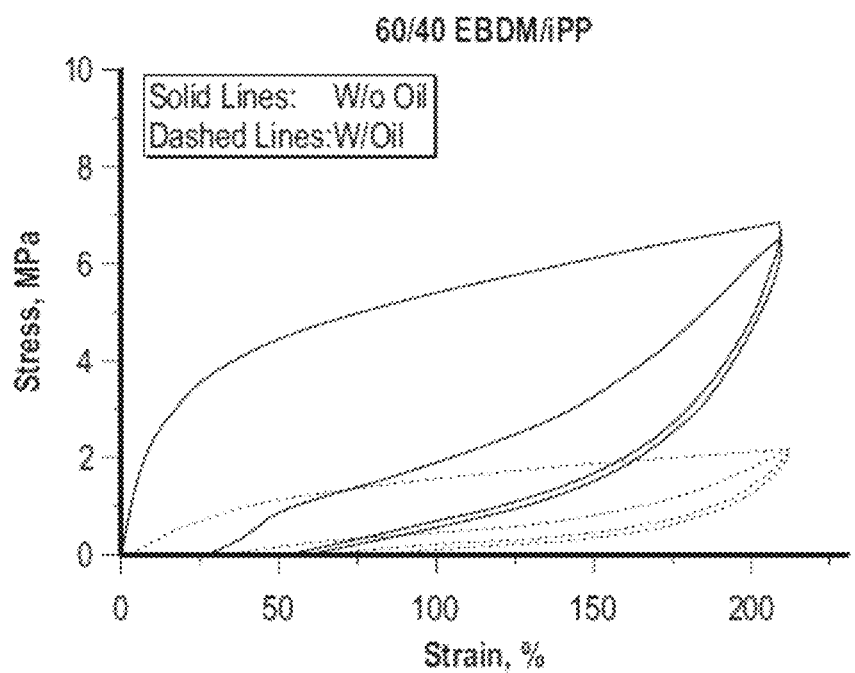
FIG. 5C is a stress vs. percent strain hysteresis graph of an inventive thermoplastic vulcanizate composition with and without paraffinic oil according to embodiments of the invention.
Figure 5D:
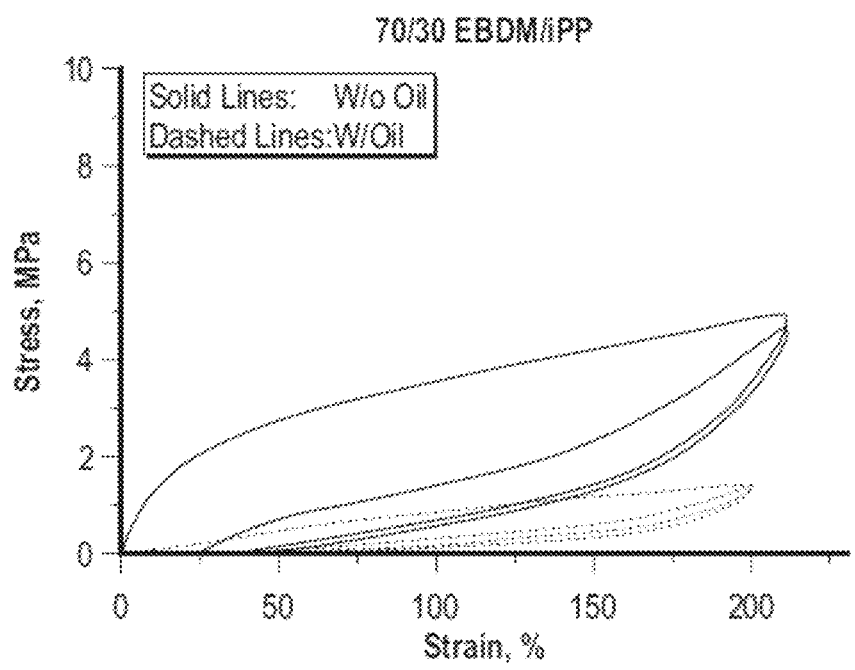
FIG. 5D is a stress vs. percent strain hysteresis graph of an inventive thermoplastic vulcanizate composition with and without paraffinic oil according to embodiments of the invention.

FIG. 4 and Table 6 below show tensile properties of the inventive TPVs as a function of composition and oil content.

TABLE 6

|  | Tensile Stress at Break MPa | % Strain at Break |
|---|---|---|
| Comparative V3666 | 13.5 | 450 |
| Example 6 | 19 | 590 |
| Example 7 | 5.5 | 390 |
| Example 8 | 16 | 510 |
| Example 9 | 5 | 480 |
| Example 10 | 13.3 | 490 |
| Example 11 | 3.5 | 380 |

As these data show, when compared to the conventional EPDM TPV, the inventive TPVs show improved tensile stress and strain at break. In particular, the inventive TPVs demonstrate very large strain at break values (600%) in the BEDM TPV with 50/50 BEDM/iPP composition (Example 5). This is a very desirable property for end uses requiring an elastic grade composition.

FIGS. 5A through 5D and Table 7 below show the hysteresis properties of these examples.

TABLE 7

|  | Hysteresis (Joules) | Tensile Set (%) |
|---|---|---|
| Comparative V3666 | 2.35 | 88 |
| Example 6 | 2.4 | 81 |
| Example 7 | 0.8 | 60 |
| Example 8 | 1.7 | 52 |
| Example 9 | 0.5 | 47 |

TABLE 7-continued

|  | Hysteresis (Joules) | Tensile Set (%) |
|---|---|---|
| Example 10 | 1.3 | 41 |
| Example 11 | 0.25 | 31 |

As these data show, the inventive TPVs demonstrate a remarkable improvement in hysteresis when compared to conventional TPVs. In addition, these data confirm that the hysteresis of the BEDMs is reduced to almost half, compared to the comparative examples. Oil addition gives an additional boost to the hysteresis reduction. The tensile set is also significantly reduced by changing composition and oil content according to embodiments of the invention.

Various modifications and alterations that do not depart from the scope and spirit of this invention will become apparent to those skilled in the art. This invention is not to be duly limited to the illustrative embodiments set forth herein.

We claim:

1. A thermoplastic vulcanizate composition, comprising a first phase bi-continuously intertwined with from about 10 wt % to 80 wt % of a second phase throughout the composition, and from about 0.1 wt % to about 10 wt % of a curative system, the first phase comprising polypropylene and the second phase comprising an at least partially cured elastomeric rubber composition, comprising from about 10 wt % to about 40 wt % ethylene, from about 5 wt % to about 10 wt % of a conjugated diene having from 4 to 12 carbon atoms, and from about 50 wt % to about 85 wt % of a $C_4$-$C_8$ alpha olefin, based on the total weight of the elastomeric rubber composition present.

2. The thermoplastic vulcanizate composition of claim 1, wherein the elastomeric rubber composition comprises about 50 wt % to about 70 wt % of the $C_4$-$C_8$ alpha olefin, based on the total weight of the elastomeric rubber composition present.

3. The thermoplastic vulcanizate composition of claim 1, wherein the elastomeric rubber composition comprises from about 10 wt % to about 40 wt % ethylene, from about 5 wt % to about 10 wt % ethylidene norbornene, and from about 50 wt % to about 85 wt % of 1-butene, based on the total weight of the elastomeric rubber composition present.

4. The thermoplastic vulcanizate composition of claim 3, wherein the elastomeric rubber composition has a number averaged molecular weight of about 100,000 g/mol to about 400,000 g/mol.

5. The thermoplastic vulcanizate composition of claim 3, wherein the elastomeric rubber composition comprises a melt index of less than 5 g/10 min @230° C./2.16 kg, when determined according to ASTM D 1238.

6. The thermoplastic vulcanizate composition of claim 1, wherein the first and second phases form a bi-continuous nanostructure morphology throughout the composition comprising a plurality of portions in which the first phase is dispersed within the second phase within an area of less than 1 µm², and a plurality of portions in which the second phase is dispersed within the first phase within an area of less than 1 µm².

7. The thermoplastic vulcanizate composition of claim 1, wherein the first phase consists essentially of isotactic polypropylene homopolymer and the second phase consists essentially of amorphous butene-ethylene-ethylidene norbornene terpolymer comprising greater than or equal to about 10 wt % and less than or equal to about 40 wt % ethylene.

8. The thermoplastic vulcanizate composition of claim 1, comprising from about 10 wt % to about 50 wt % of the second phase, based on the total weight of the thermoplastic vulcanizate composition.

9. The thermoplastic vulcanizate composition of claim 1, wherein the first phase and the second phase are fully melt-miscible at a temperature above the melting points of both the first and the second phases.

10. The thermoplastic vulcanizate composition of claim 1, further comprising greater than or equal to about 1 part per hundred rubber to less than or equal to about 500 parts per hundred rubber of a paraffinic oil, based on the total weight of the elastomeric rubber composition present.

11. The thermoplastic vulcanizate composition of claim 1, further comprising from 1 part per hundred rubber to 200 parts per hundred rubber of a paraffinic oil, based on the total weight of the elastomeric rubber composition present.

12. The thermoplastic vulcanizate composition of claim 1, having a single glass transition temperature, when determined according to ASTM D4440.

13. The thermoplastic vulcanizate composition of claim 1, having a Shore A hardness of less than or equal to about 70 when determined according to ASTM D2240.

14. The thermoplastic vulcanizate composition of claim 1, having a flexural modulus of less than or equal to about 150 MPa when determined according to ASTM D790.

15. The thermoplastic vulcanizate composition of claim 1, having an elongation at break of greater than or equal to about 400% when determined according to ASTM D638.

16. The thermoplastic vulcanizate composition of claim 1, having a tensile stress at break of less than 20 MPa when determined according to ASTM D638.

17. The thermoplastic vulcanizate composition of claim 1, having a hysteresis J of less than 2.5 MPa when determined according to ASTM D624.

18. The thermoplastic vulcanizate composition of claim 1, having a tensile set of less than about 80% when determined according to ASTM D624.

19. An article comprising the thermoplastic vulcanizate composition of claim 1.

20. The thermoplastic vulcanizate composition of claim 1, wherein the second phase comprises less than 0.1 wt % propylene.

21. A process to produce a thermoplastic vulcanizate composition comprising:
   a) combining:
      i) a first component comprising propylene;
      ii) from 10 wt % to 80 wt % of a second elastomeric rubber component comprising from about 10 wt % to about 40 wt % ethylene and from about 5 wt % to about 10 wt % of a conjugated diene having from 4 to 12 carbon atoms and from about 50 wt % to about 85 wt % of a $C_4$-$C_8$ alpha olefin; and
      iii) from about 0.1 wt % to about 10 wt % of a curative system, based on the total weight of the composition, under melt conditions to form a melt mixture in which the first component and the second component are fully melt miscible; and
   b) dynamically vulcanizing the composition to at least partially cure the elastomeric rubber component; and
   c) cooling the melt mixture to form the thermoplastic vulcanizate composition comprising an intertwined bi-continuous nanostructure morphology throughout the composition comprising a plurality of portions in which the first phase is dispersed within the second phase within an area of less than 1 μm², and a plurality of portions in which the second phase is dispersed within the first phase within an area of less than 1 μm².

22. The process of claim 21, wherein the first phase consists essentially of isotactic polypropylene and the elastomeric rubber component comprises from about 10 wt % to about 40 wt % ethylene, from about 5 wt % to about 10 wt % ethylidene norbornene, from about 50 wt % to about 85 wt % of 1-butene, and less than 0.1 wt % propylene, based on the total weight of the elastomeric rubber component present.

23. The process of claim 21, further comprising combining from 1 part per hundred rubber to 200 parts per hundred rubber of a paraffinic oil with the first component and the second component under melt conditions, based on the total amount of the elastomeric rubber component present.

24. The process of claim 21, wherein the thermoplastic vulcanizate composition has: i) a single glass transition temperature, when determined according to ASTM D4440; ii) a Shore A hardness of less than or equal to about 70 when determined according to ASTM D2240; iii) a flexural modulus of less than or equal to about 150 MPa when determined according to ASTM D790; iv) an elongation at break of greater than or equal to about 400% when determined according to ASTM D638; v) a tensile stress at break of less than 20 MPa when determined according to ASTM D638; vi) a hysteresis J of less than 2.5 MPa when determined according to ASTM D624; vii) a tensile set of less than about 80% when determined according to ASTM D624; or a combination thereof.

\* \* \* \* \*